US007890508B2

(12) United States Patent
Gerber et al.

(10) Patent No.: US 7,890,508 B2
(45) Date of Patent: Feb. 15, 2011

(54) DATABASE FRAGMENT CLONING AND MANAGEMENT

(75) Inventors: Robert H. Gerber, Bellevue, WA (US); Balan Sethu Raman, Redmond, WA (US); James R. Hamilton, Bellevue, WA (US); John F. Ludeman, Sammamish, WA (US); Murali M. Krishna, Bellevue, WA (US); Samuel H. Smith, Albuquerque, NM (US); Shrinivas Ashwin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/207,482

(22) Filed: Aug. 19, 2005

(65) Prior Publication Data

US 2007/0043749 A1    Feb. 22, 2007

(51) Int. Cl.
*G06F 7/00*    (2006.01)
*G06F 17/30*    (2006.01)

(52) U.S. Cl. .................. 707/736; 707/756; 715/227; 715/229

(58) Field of Classification Search ............... 707/101, 707/201, 20, 202, 203, 204
See application file for complete search history.

(56) References Cited

U.S. PATENT DOCUMENTS

| 4,432,057 | A | 2/1984 | Daniell et al. |
| 4,933,038 | A | 6/1990 | Liu |
| 5,170,480 | A | 12/1992 | Mohan et al. |
| 5,440,727 | A | 8/1995 | Bhide et al. |
| 5,555,404 | A | 9/1996 | Torbjornsen et al. |
| 6,377,959 | B1 | 4/2002 | Carlson |
| 6,539,381 | B1 | 3/2003 | Prasad et al. |
| 6,694,337 | B1 * | 2/2004 | King et al. ................. 707/201 |
| 6,820,180 | B2 * | 11/2004 | McBrearty et al. .......... 711/162 |

(Continued)

FOREIGN PATENT DOCUMENTS

WO    2004/090724 A1    10/2004

OTHER PUBLICATIONS

Ning An et al. "Improving performance with bulk-inserts in Oracle R-trees," Sep. 2003, VLDB Endowment, Proceedings of the 29th International Conference on Very Large Data Bases, vol. 29 (Berlin, Germany, Sep. 12, 2003), ISBN:0-12-722442-4, pp. 948-951.*

(Continued)

*Primary Examiner*—Mohammad Ali
*Assistant Examiner*—Angelica Ruiz

(57) ABSTRACT

Mechanisms and techniques for database fragment cloning and management are provided. A database object, such as a table, rowset or index, is divided into fragments. Each fragment is cloned to create cloned fragments, which operationally are substantially identical to one another. One or more of the cloned fragments may be designated as a primary cloned fragment for performing database operations or as a secondary cloned fragment for serving as backup. Updates to each fragment are implemented on the primary cloned fragment and are then propagated from the primary cloned fragment to the corresponding secondary cloned fragments. A cloned fragment can go offline, becoming unavailable to be updated. When the cloned fragment returns online, the cloned fragment is refreshed with data included in the primary cloned fragment. While being refreshed, the cloned fragment may continue to be updated. The cloned fragment is eligible to be designated as a primary cloned fragment when the refreshing process has been completed.

7 Claims, 17 Drawing Sheets

U.S. PATENT DOCUMENTS

| | | | |
|---|---|---|---|
| 7,164,676 B1 * | 1/2007 | Chakraborty | 370/368 |
| 2003/0097381 A1 * | 5/2003 | Detweiler et al. | 707/201 |
| 2005/0149582 A1 * | 7/2005 | Wissmann et al. | 707/201 |
| 2008/0126439 A1 * | 5/2008 | Kaminsky | 707/203 |

OTHER PUBLICATIONS

Betty Salzberg, Allyn Dimock; Principles of Transaction-Based On-Line Reorganization; College of Computer Science Noartheastern University; Boston Massachusetts, 02115.

International Search Report, PCT/US06/28346, Jul. 20, 2006 pp. 1-12.

Search Report Received for European Patent Application No. 06800192.4 mailed on Sep. 24, 2009, 12 pages.

Office Action Received for European Patent Application No. 06800192.4 mailed on Nov. 17, 2009, 7 pages.

International Preliminary Report on Patentability Received for PCT application No. PCT/US2006/028346, mailed on Feb. 28, 2008, 8 pages.

* cited by examiner

DATABASE FRAGMENT CLONING AND MANAGEMENT

BACKGROUND

Database systems are typically used to effectively manage information that is organized for accessibility. To ensure availability, a system may include backup copies of the database in case the primary copy is damaged or lost. One common technique for database backup is to periodically copy an entire database onto computer-readable media. For example, an information system administrator may copy the database onto disks or tapes at the end of each week. Although a copy of the database can be preserved in this manner, copying the entire database is time-consuming and the activities between the backup intervals are lost if not tracked through other means.

Another technique of database backup involves maintaining copies of the same database on different computing machines. In the event that one of the databases became unusable, another copy of the database in another computing machine can still be accessed. This type of failover backup can ensure database availability. However, synchronizing multiple copies of the entire database in different machines in real-time is a complex and costly process.

An effective way to ensure the availability of a database without undue complexity or unnecessary loss of data continues to elude those skilled in the art.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides mechanisms and techniques for database fragment cloning and management. A database object, such as a table, a rowset, index, or a partition of a table or index, is divided into fragments. Note that a rowset is considered to be a set of rows in a table or entries in an index. The terms row and record are considered substantially identical. Thus, a rowset is also equivalent to a recordset. Each fragment is cloned to create cloned fragments, which operationally are substantially identical to one another. One of the cloned fragments may be designated as a primary cloned fragment for performing database operations and one or more cloned fragments may be designated as secondary cloned fragments for purposes of serving as backup to the primary fragment clone. Updates to each fragment are implemented on the primary cloned fragment and are then propagated from the primary cloned fragment to the corresponding secondary cloned fragments.

A cloned fragment can go offline, becoming unavailable to updates. Such an offline, unavailable cloned fragment is defined to be a stale cloned fragment, as the data in such a cloned fragment may no longer be transactionally up-to-date with the corresponding primary cloned fragment. When the stale cloned fragment returns online, the cloned fragment is refreshed with data included in the primary cloned fragment. While being refreshed, the cloned fragment may continue to be updated. The cloned fragment becomes immediately eligible as a candidate to be designated as the primary cloned fragment when the refreshing process has been completed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present example and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a database fragment cloning and management system, the system described is provided as an example and not a limitation. As those skilled in the art will appreciate, the present examples are suitable for application in a variety of different types of database fragment cloning and management systems.

Figure 1:
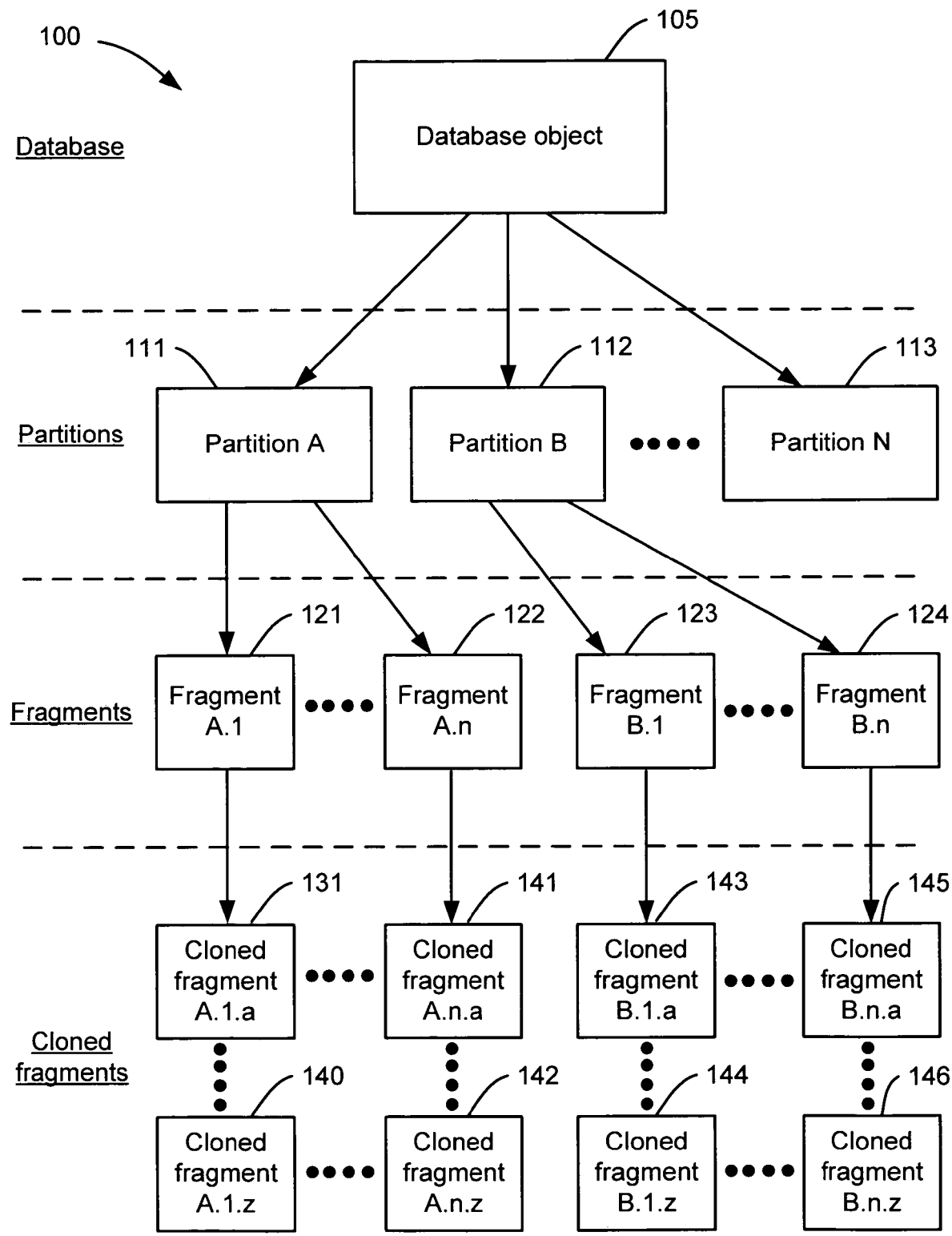
FIG. 1 shows an example cloning data structure of a database object managed by a database system.

FIG. 1 shows an example cloning data structure 100 of a database object 105 managed by a database system. A database is a collection of information organized in a manner that enables desired pieces of data in the database to be quickly selected and/or updated. A database object may be the entire or any portion of the database. For example, database object 105 may be an entire table, an index, a set of rows (e.g. rowset), or the like.

Database object 105 may be divided into partitions 111-113. Typically, database object 105 is partitioned for convenience or performance reasons. For example, database object 105 may include data associated with multiple years. Database object 105 may be divided into partitions 111-113 where each partition is associated with a particular year. Partitioning of database object 105 is an optional step that may or may not be implemented in an actual implementation.

Each partition 111-113 of database object 105 (or the entire, unpartitioned object 105) is typically divided into fragments, such as fragments 121-124. Fragments 121-124 are portions of database object 105 divided by the database system on an operational basis. For example, fragments 121-124 may be assigned to different computing devices so that a query associated with database object 105 may be performed with fragments 121-124 by the computing devices working in parallel.

Fragments in database object 105 are further cloned to create cloned fragments. As shown in FIG. 1, each of logically divided fragments 121-124 are cloned to produce example cloned fragments 131, 140-146. Typically, fragments of a database object (or of a partition of a database object) are created by splitting such an object into discrete sets of rows (for tables) or index entries (for indices). Hashing on a key of a table or index is one basis for accomplishing such splitting. Sets of rows are sometimes referred to as rowsets or as sets of records. Cloned fragments will be discussed in more detail in conjunction with FIG. 2. Briefly stated, when properly updated, the cloned fragments associated with a particular fragment of database object 105 are operationally identical so that the cloned fragments may be readily used by the database system. The use of cloned fragments enable two or more copies of a particular fragment to be available for use, such as to maintain a high level of data availability, speed up queries and other database operations, perform load-balancing, or the like. For example, to maintain a high level of data availability, at least one cloned fragment may serve as a backup of another cloned fragment that is used for database operations. To speed up searches, multiple operationally identical cloned fragments may be used concurrently for database queries. To perform load-balancing, different, but operationally identical copies of cloned fragments may be activated based on workload conditions.

Figure 2:
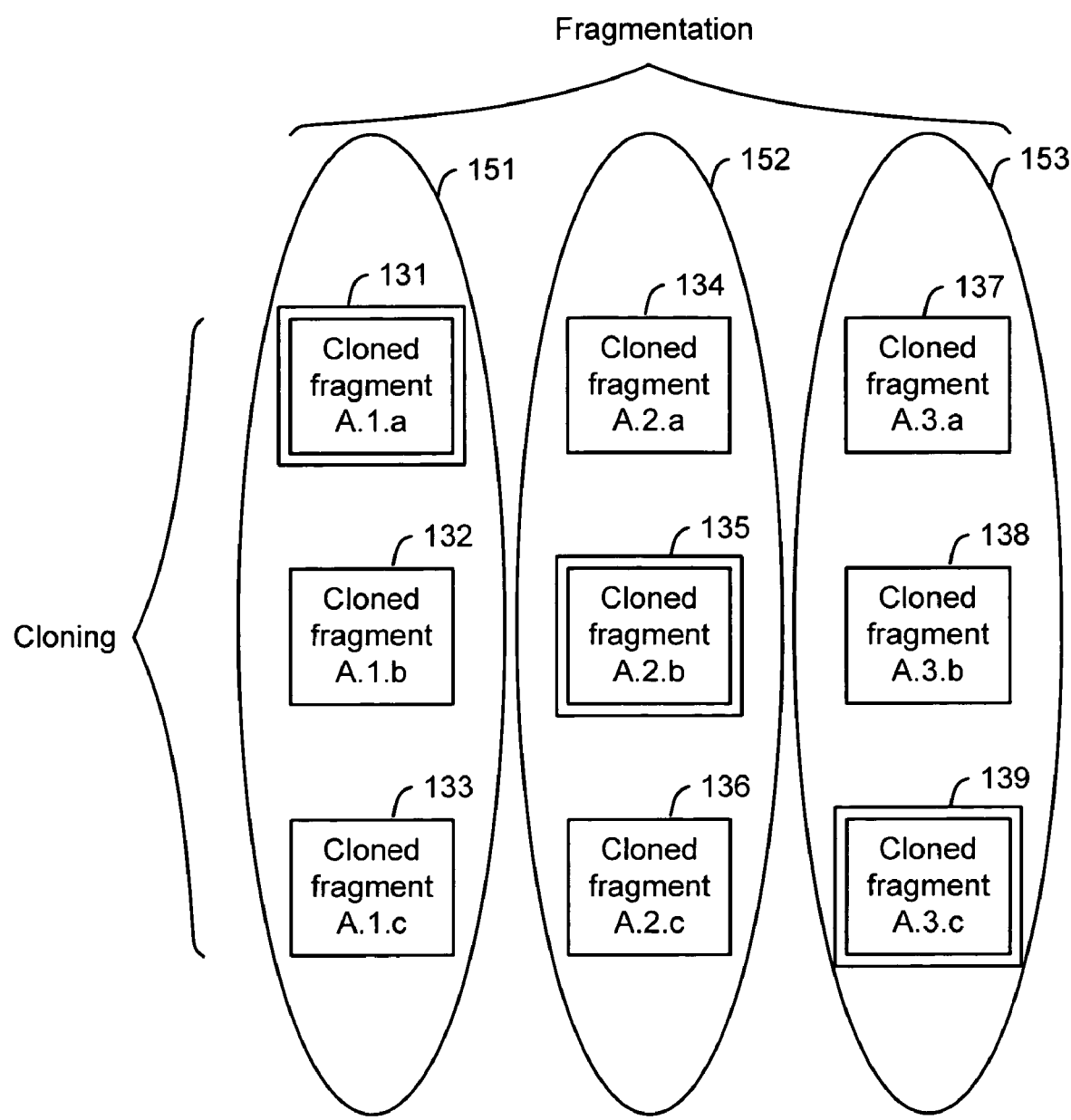
FIG. 2 shows example cloned fragments of a database object.

FIG. 2 shows example cloned fragments 131-139 of a database object. As shown in the figure, the cloned fragments 131-139 can be viewed as three groups 151-153. Each group of cloned fragments is related to a particular fragment of a database object. The cloned fragments within each group are created as operationally identical to each other. Thus, when properly updated, each of the cloned fragments 131-139 can be used for database operations that are applicable to the corresponding fragments 151-153.

In one embodiment, cloned fragments 131-139 may be configured to provide a high level of data availability. In this embodiment, a cloned fragment from each of the groups 151-153 can be designated as the primary cloned fragment for database operations. Other cloned fragments in the group are secondary cloned fragments that serve as readily available backups. In FIG. 2, cloned fragments 131, 135 and 139 are shown as primary cloned fragments while the remaining cloned fragments are designated as secondary cloned fragments.

To provide a high level of data availability, each of the cloned fragments in the group may be included in different devices so that if one of the devices fails, a secondary cloned fragment in another device can very quickly replace the cloned fragment in the failed device as the primary cloned fragment. For example, cloned fragments 131-133 may each be included in separate devices so that either of the secondary cloned fragments 132-133 may be designated as primary if the device in which the primary cloned fragment 131 is included fails.

The database system that manages the cloned fragments may perform various operations on cloned fragments. These operations are typically performed using standard database operations, such as Data Manipulation Language (DML) statements or other structured query language (SQL) statements. Example operations to update and refresh cloned fragments will be discussed in more detail in conjunction with FIGS. 3 and 4. In one example implementation, operations may include:

1. Creating a cloned fragment
  A cloned fragment can be created to be indistinguishable from a normal table or an index rowset in a database.
2. Deleting a cloned fragment
  Clones can be deleted just like rowsets in a database.
3. Fully initializing a cloned fragment's data
  A cloned fragment can be completely initialized, from scratch, to contain a new rowset that is loaded into the cloned fragment.
4. Propagating data changes to a cloned fragment
  Changes to the primary cloned fragment are propagated to one or more secondary cloned fragments. Propagation occurs within the same transactional context as updates to the primary cloned fragment.
5. Refreshing a stale cloned fragment
  When a cloned fragment has been offline or has otherwise not received transaction propagation of updates from the primary cloned fragment, it is defined to be a stale cloned fragment. Stale cloned fragments can also be described as outdated fragment clones. The process of bringing a stale clone back to transactional consistency with a primary fragment clone is called refresh.
6. Reading a cloned fragment
  A cloned fragment can be read for purposes of data retrieval (table access) or for lookup (index access) just like normal tables or indices are read and accessed. In this implementation, user workloads only read from primary cloned fragments. This restriction may be used for purposes of simplifying the mechanism for avoiding unnecessary deadlocks in the system. However, this restriction may be relaxed if deadlocks are either not a problem or are avoided through other means in a given system.
7. Updating a cloned fragment
  User workloads update the primary cloned fragment and the database system propagates and applies those changes to secondary clones corresponding to that primary fragment within the same transaction. Propagating a change means applying a substantially identical DML operation to a secondary clone that was applied to a primary clone.

Figure 3:
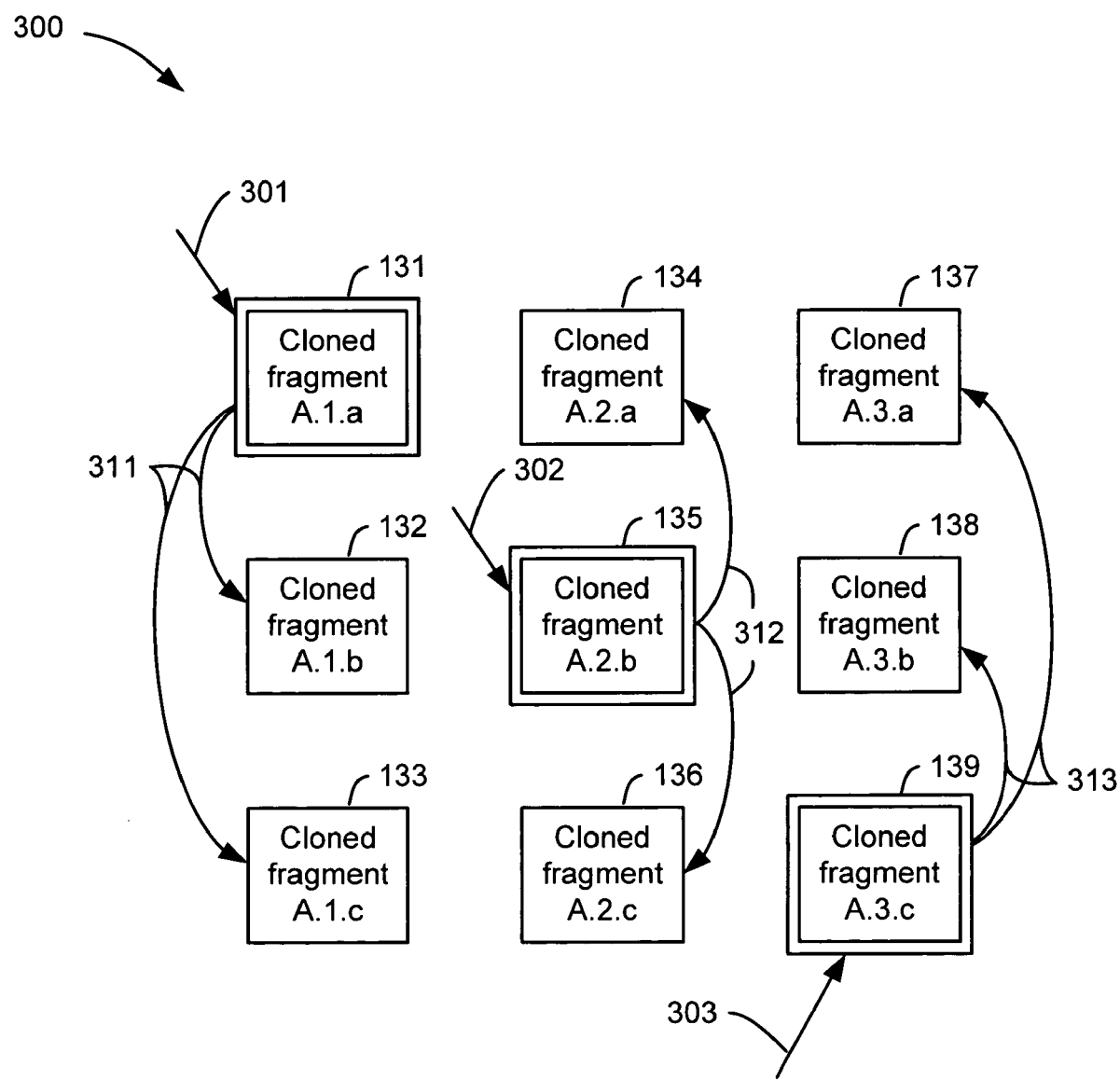
FIG. 3 shows example operations for updating cloned fragments of a database object.

FIG. 3 shows example operations 300 for updating cloned fragments 131-139 of a database object. Database updates may include any type of modifications, such as adding, deleting and changing data. When changes associated with a database object are determined, the fragments in the database object that need to be updated are identified. The primary cloned fragments corresponding to the identified fragments are updated. As shown in the figure, operations 301-303 are operations to update primary cloned fragments 131, 135 and 139, respectively. After primary cloned fragments 131, 135 and 139 have been updated, the updates are then propagated to the corresponding secondary cloned fragments. In FIG. 3, operations 311-313 are operations to update the secondary cloned fragments corresponding to the updated primary cloned fragments.

Typically, operations 301-303 and 311-313 are implemented via the standard database operations of insert, update and delete that implement the DML statement semantics. To achieve consistency, the operations to update a primary cloned fragment and the operations to update the secondary fragments corresponding to the primary cloned fragment may be configured as an atomic set of operations.

Figure 4:
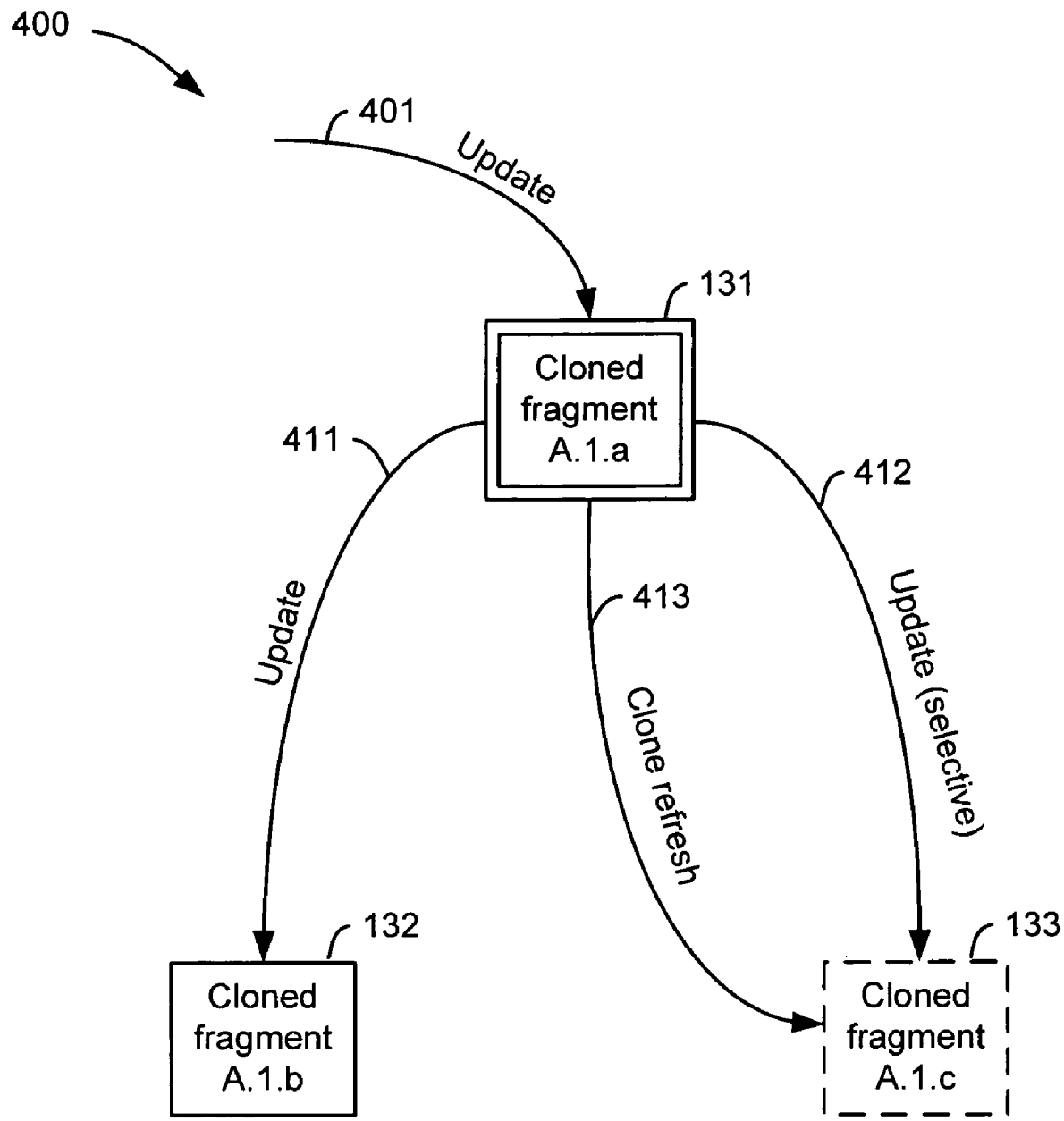
FIG. 4 shows example operations for refreshing a stale cloned fragment associated with a database object.

FIG. 4 shows example operations 400 for refreshing a stale cloned fragment 133 associated with a database object. A cloned fragment is stale if the fragment has not been available to execute the propagated update operations associated with the database object corresponding to the stale fragment. For example, cloned fragment 133 might have been unavailable for updating due to a variety of reasons, such as a device failure, loss of connectivity, system update, or the like. To be useful, secondary cloned fragment 133 will have to be brought back to transactional consistency with primary cloned fragment 131 through a refreshing process.

When cloned fragment 133 returns online and becomes available to execute updating operations, cloned fragment 133 is refreshed based on data included in the current, primary cloned fragment that contains all current and past updates. For example, in FIG. 4, clone refresh operation 413 is executed to refresh cloned fragment 133 with data included in primary cloned fragment 131. In this manner, cloned fragment 133 is refreshed with updates that occurred while cloned fragment 133 was unavailable. For efficiency, clone refresh operation 413 can be implemented via SQL delete operations that remove stale rows and SQL insert operations that add new rows copied from the primary. Such an implementation enables the refreshing operation to be managed via similar executions paths to those used by normal SQL statement executions in the database system without adding extra processes.

An update operation 401 for primary cloned fragment 131 occurs when an update for the database object affects the portion of the object corresponding to the primary cloned fragment 131. The update is then propagated to secondary cloned fragments associated with primary cloned fragment 131. As shown in FIG. 4, secondary cloned fragment 132 is updated by operation 411 associated with primary cloned fragment 131. The need to update a cloned fragment can occur while the cloned fragment is being refreshed. For example, an update for cloned fragment 133 may occur while clone refresh operation 413 is executing. Update operation 412 can be performed on cloned fragment 133 while clone refresh operation 413 is executing. Typically, a user's update operation 412 is a higher priority database operation than clone refresh operation 413. Update operation 412 and clone refresh operation 413 may be implemented in a variety of ways and timing relative to each other. For example, when updating is necessary, update operation 412 on cloned fragment 133 may be completed before clone refresh 413 continues. Furthermore, clone refresh 413 is designed to minimize both the frequency and duration of any delays caused due to locking against any given update operation 412. Clone refresh accomplishes that by running as a sequence of small, transactional batches that take and hold locks for only short intervals of time. Operation 412 updates only the rows or entries in the stale clone that have already been refreshed by operation 413 or that remained unchanged in the primary while the stale clone was offline. That is, operation 412 is prevented from updating a row that is out-of-date in a stale clone. A propagated update operation is not allowed to make an inconsistent row in a stale clone appear to be up-to-date. This restriction could be relaxed in an implementation in which an entire row is propagated with update 412. However, performance reasons would tend to discourage such an operation 412 that propagated entire rows for all DML operations, regardless of whether only a few column values had changed. It is the responsibility of the clone refresh operation 413 to introduce new, up-to-date rows into a stale clone.

Operations 400 to refresh a stale cloned fragment shown in FIG. 4 enable a database system to refresh a stale cloned fragment back to transactional consistency with the corresponding primary fragment, while maintaining the online status of that primary using standard database operations. The use of standard database operations, such as those representing DML statements, allows clone refreshing to be managed as an extra, but standard SQL statement load on the database system, without the need for special processes. Operations 400 also enables the refreshing of a stale cloned fragment without having to exclusively lock the entire fragment and without having to prolong the refreshing process with the need to catch up the updates that may have occurred during the refresh process, since those updates continue to be applied while the refresh operation 413 proceeds Significantly, operations 400 further enable a stale secondary cloned fragment to be efficiently updated so as to quickly become eligible to be a primary cloned fragment.

In one example implementation, clone refresh operation 413 includes multiple small batches of refreshing operations. Using small batches of refreshing operations avoids blocking out concurrent user workloads for large periods of time. Thus, the refreshing process is performed in an incremental fashion, allowing the process to co-exist online with user workloads.

Multiple instances of the clone refresh operation 413 shown in FIG. 4 can run concurrently against different stale cloned fragments within the same or different fragments of any database object. That is, such refresh operations are independent of each other.

Figure 5:
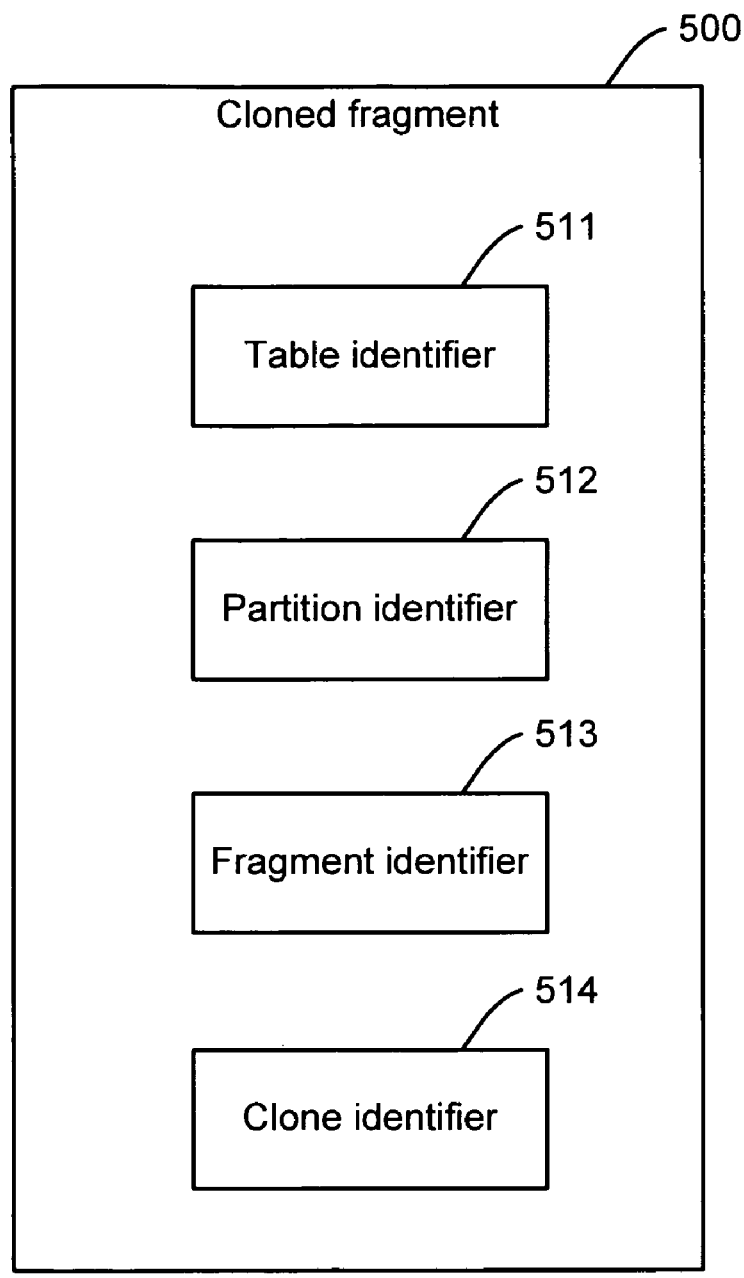
FIG. 5 shows an example data structures for identifying a cloned fragment.

FIG. 5 shows an example data structures 511-514 for identifying a cloned fragment 500. Data structure 500 is used to identify a cloned fragment corresponding to a database object. In this example, the data structure identifies cloned fragment 500 that corresponds to a table associated with a database. As shown in FIG. 5, the identifier for cloned fragment 500 may include table identifier 511, partition identifier 512, fragment identifier 513 and clone identifier 514. Table identifier 511 identifies the database object (a table in this case) to which cloned fragment 500 corresponds. A database object may be divided into partitions to separate data for convenience or performance reasons. Partition identifier 512 identifies the partition to which cloned fragment 500 corresponds.

The database system that manages the database object is configured to automatically separate the database object into fragments and to clone the fragments. Fragment identifier 513 identifies the particular fragment of the database object to which cloned fragment 500 corresponds. Clone identifier 514 identifies cloned fragment 500 among the multiple cloned fragments associated with the particular fragment of the database object.

Figure 6:
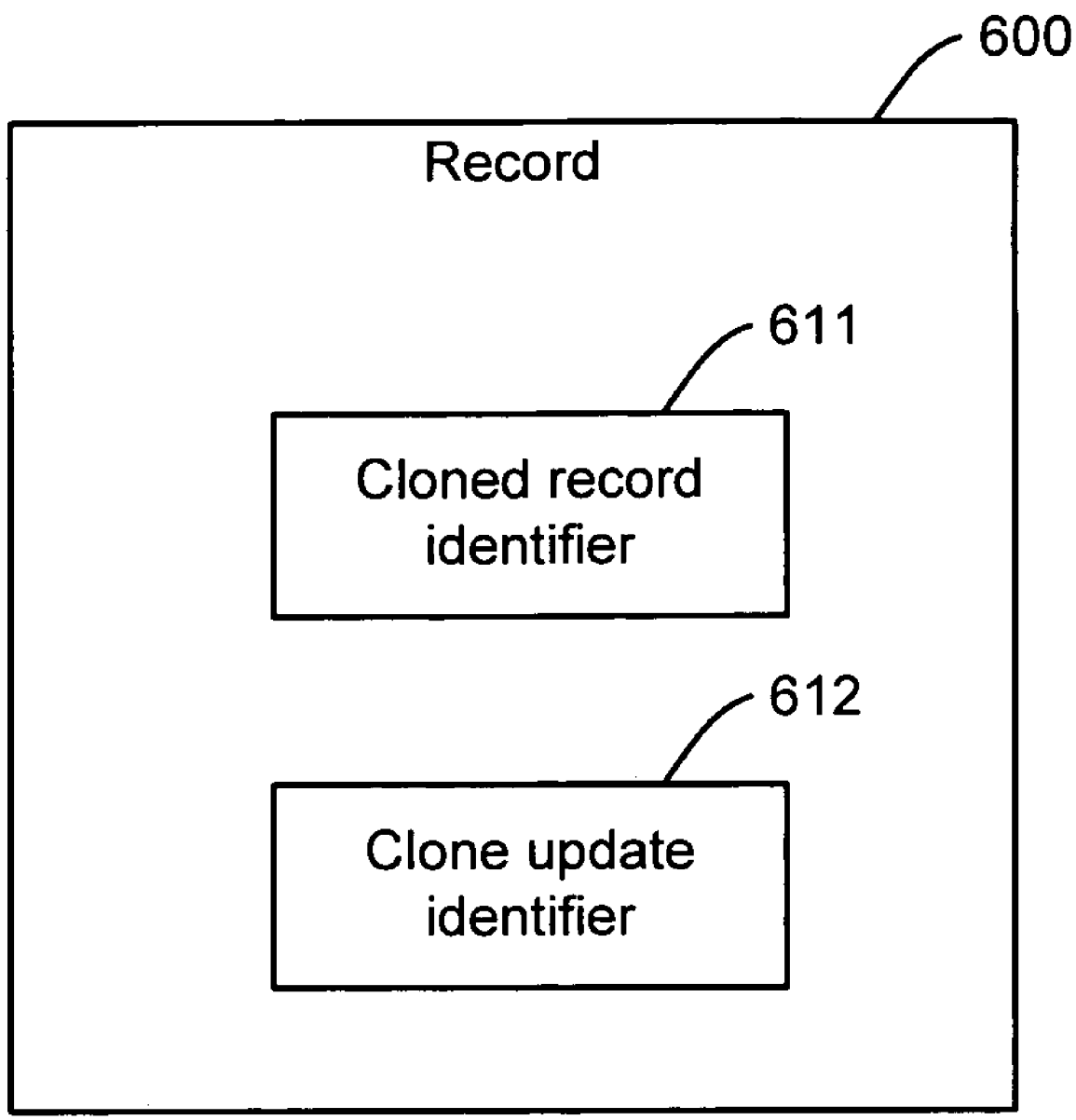
FIG. 6 shows an example data structures for identifying a record in a cloned fragment of a database object.

FIG. 6 shows an example data structures 611-612 for identifying record 600 in a cloned fragment of a database object. A cloned fragment can include records (or index entries) of a database. For example, the cloned fragment may include records embodied as rows in a portion of a table associated with the database. Data structures 611-612 in record 600 enable record 600 in the cloned fragment and the update status of the record to be identified.

As shown in FIG. 6, record 600 may include a cloned record identifier 611 and a clone update identifier 612. Cloned record identifier 611 uniquely identifies record 600 within the corresponding table or index. Cloned record identifiers in index records are propagated with updates from the corresponding cloned data fragments. A user-defined unique key may be used as a cloned record identifier or a system defined unique key may be added (or augmented to the user defined key) such that the composite key is sufficiently unique to serve as a cloned record identifier. For example, a fragment identifier can be added to a key for purposes of providing additional uniqueness. A clone update identifier identifies the update status of record 600. In this example implementation, cloned record identifier 611 should be unique within the context of a given table. Clone update identifier 612 only has to uniquely identify the update status of a record relative to the update status of the other records with the same cloned record identifier 611 for a given database object uniquely over time.

In one embodiment, a database system includes primary cloned fragments and secondary cloned fragments and the cloned fragments include rows. Both cloned record identifier 611 and clone update identifier 612 may be included as columns in the rows of cloned fragments. The columns of cloned record identifier 611 and clone update identifier 612 may be included in the secondary cloned fragments, and contain identical values as they do on the primary cloned fragment when a secondary cloned fragment is transactionally consistent. Thus, the cloned record identifier 611 enables a mapping of rows between primary and secondary cloned fragments, and clone update identifier 612 allows the verification of whether the rows are consistent.

The refreshing process for a stale cloned fragment uses the cloned record identifier (CRID) and clone update identifier (CUID) to determine whether a particular record in the cloned fragment should be refreshed. For example, a record in a stale cloned fragment may include:

CRID=x and CUID=y

The corresponding record in the primary cloned fragment associated with the stale cloned fragment may include:

CRID=x and CUID=z

The refreshing process uses the CRID to identify each record in the stale cloned fragment and to locate the corresponding record in the primary cloned fragment, if it exists. The refreshing process then compares each such record in the stale cloned fragment with the corresponding record in the primary cloned fragment, if it exists, to determine whether the record in the stale cloned fragment should be updated.

Fragments of a database object can be any type of fragments, such as a data fragment, an index fragment, or the like. For an index fragment, each row in an index specifies where the row came from by storing its data fragment identifier as part of the index key. The index itself does not need to know which of the clones of a base table fragment is currently the primary. As there is one primary cloned fragment for a given fragment, an index record can be mapped to a specific fragment for access purposes, at any given time. Thus, index fragments may include a co-existing collection of disjoint secondary rowsets (or index entries) that refer to different fragments of a table. As long as each such secondary rowset is treated separately from the others in the same index fragment, the assumptions and the technique outlined above continue to apply. For implementation, locking the rows in an index fragment corresponding to any particular base table fragment should not cause any locking on the other rows in the index fragment (which do not correspond to that base table fragment).

Index fragments can be cloned similar to data fragments. For the purposes of update propagation, cloned index fragments are treated as additional indexes on the same set of base table fragments. That is, updates to all cloned index fragments propagate directly from the primary cloned data fragments of the base table on which the cloned index fragments are built. While it is possible to propagate updates from one index fragment to another, this process may introduce an additional latency step. If the set of index entries in a given index fragment corresponding to the records in a given data fragment are treated as a secondary rowset, then the corresponding primary rowset is substantially identical to a base table fragment. Each secondary rowset in a clone of an index fragment is thus independent of all the other secondary rowsets within that same clone for update propagation purposes.

Figure 7:
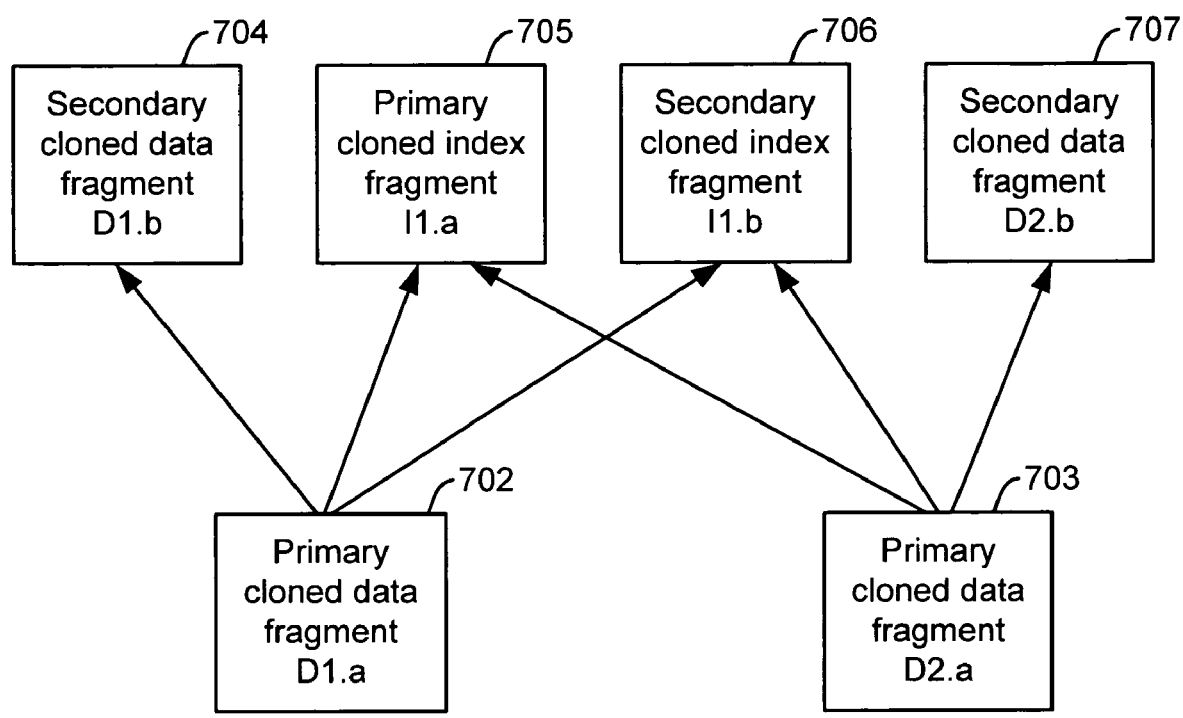
FIG. 7 shows example processes for updating secondary cloned index fragments and secondary cloned data fragments.

FIG. 7 shows examples processes for updating cloned index fragments and cloned data fragments. As discussed above, an up-to-date (or current) secondary cloned fragment of a data fragment is substantially identical to the primary cloned fragment for a given data fragment. Similarly, an up-to-date secondary cloned fragment of an index fragment is substantially identical to the primary cloned fragment for that index fragment. Cloned index fragments are allowed to contain index entries that refer to records in more than one data fragment. Hence, cloned index fragments may receive propagated updates from more than one cloned data fragment.

The example in FIG. 7 shows an index fragment I1 contains index entries that reference records in two distinct data fragments, D1 and D2. In this example, both the primary cloned index fragment I1.*a* 705 and secondary cloned index fragment I1.*b* 706 receive propagated updates directly from both the primary cloned data fragment D1.*a* 702 and the primary cloned data fragment D2.*a* 703.

The mapping between data fragments and index fragments represents the result of a standard database operation called physical database design. For any given indexed column of a table, column values can be discretely mapped to one or more index fragments based upon the partitioning and fragmentation definitions of the index. The partitioning definitions for tables and indices may specify any of the traditional database methods of spitting records into sets, e.g. by ranges of values, hashing of values or via round-robin assignments. System defined fragmentation definition is accomplished via hashing on a key of a table or index. However, if the hash based fragmentation populates fragments with rows (or index entries) in a highly disproportionate, data-skewed fashion, a round-robin assignment of rows to fragments can be used.

When a cloned index fragment becomes stale and needs to be refreshed, there are two potential ways to accomplish the refresh. If a primary cloned index fragment exists, the stale secondary cloned index fragment can be refreshed directly from that primary cloned index fragment. Alternately, a stale secondary cloned index fragment can be directly refreshed from the set of primary cloned data fragments of the indexed table. In the latter case, only those records in the primary cloned data fragments are used in the refresh whose key values map to the index fragment that is being refreshed.

In an example implementation, clone update identifier (CUID) values may be maintained on a per-table basis. That is, for a DML statement that updates a given primary cloned fragment, a CUID value is read from metadata specific to that fragment's table. Records that are updated by that statement are assigned that CUID value. When the updates to those records are propagated to a secondary cloned fragment, the new CUID values assigned are also propagated.

In this example implementation, CUID values are unique to a given table over time. The current CUID value is persisted transactionally in the metadata that describes a given table.

At the point that CUID values hit the point of wrapping around from a maximum value to a minimum value, various techniques can be used to reset CUID values to a consistent minimum value. Given the byte range of values for CUIDs (e.g. around 6 bytes), this case would occur on a historical scale of time. One simple technique for resetting CUID values would take an exclusive lock on a table and reset the CUID values in all records in that table's primary cloned fragments to the minimum CUID value. Then, the normal update propagation mechanism would effectively reset the CUIDs in the secondary cloned fragments.

The CUID values for a table are incremented every time a fragment of the table goes offline. This implementation will be discussed below in conjunction with FIG. 12.

Other CUID assignment policies are possible, but each has the potential to affect the basic technique for clone refresh. For example, transaction IDs can be used as a basis for CUID values, but require a somewhat less advantageous clone refresh technique in order to ensure update propagation and clone refresh interact correctly. Specifically, in the WaitForPropagation step (described below), the basic Clone Refresh technique would have to wait for all currently active transactions to complete, instead of just waiting for all current DML statements to complete.

In general, a technique for managing CUID values can be implemented if the technique can satisfy the following requirements:
  a) For a given CRID value used within a fragment, all records identified by that CRID value in transactionally consistent secondary cloned fragments must have CUID values that are identical to the CUID value in the record identified by that CRID value in the primary cloned fragment.
  b) For a given fragment, if a CRID is found in a stale secondary cloned fragment (prior to refresh) as well as in the primary cloned fragment, then the CUIDs can be the same only if the row has not been updated in the primary cloned fragment since the secondary cloned fragment became stale.

An example DML statement for updating a cloned fragment is shown below. The example DML statement includes: two records in Sales.2004.1.a (cloned record identifiers (CRIDs): 5 & 3) that are updated using a CUID value of 3.

The example Sales.2004.1.a primary cloned fragment is shown in

TABLE 1

| Primary cloned fragment Sales.2004.1.a | | |
| --- | --- | --- |
| CRID | CUID | Other columns |
| 1 | 2 | ... |
| 5 | 3 | ... |

TABLE 1-continued

| Primary cloned fragment Sales.2004.1.a | | |
| --- | --- | --- |
| CRID | CUID | Other columns |
| 7 | 1 | ... |
| 3 | 3 | ... |
| 8 | 1 | ... |

After the primary cloned fragment Sales.2004.1.a is updated, those updates are propagated and applied to the secondary cloned fragment Sales.2004.1.b as shown in Table 2.

TABLE 2

| Primary cloned fragment Sales.2004.1.b | | |
| --- | --- | --- |
| CRID | CUID | Other columns |
| 1 | 2 | ... |
| 5 | ~~2~~ 3 | ... |
| 7 | 1 | ... |
| 3 | ~~1~~ 3 | ... |
| 8 | 1 | ... |

At a given point in time, an available fragment has one primary cloned fragment (potential source for a clone refresh) and N secondary clones (potential targets of a refresh). A secondary cloned fragment whose rows are not transactionally consistent with the corresponding rows in a primary cloned fragment is an outdates or stale cloned fragment. The rows (records or index entries) within a stale cloned fragment can be in one of the following example states. The term primary row refers to a row in a primary cloned fragment. Rows within a stale cloned fragment may be:

1. Consistent

Primary row didn't change while the stale secondary cloned fragment was offline. Or else, a refresh process has already updated the row in the stale secondary cloned fragment to be consistent with a corresponding primary row. A consistent row in a secondary cloned fragment corresponds to a row in a primary cloned fragment that has the same CRID and CUID values.

2. Inconsistent

Primary row was updated while stale secondary cloned fragment was offline. An inconsistent row in a stale secondary cloned fragment corresponds to a row in a primary cloned fragment with the same CRID value, but a different CUID value.

3. Missing

New primary row was created while the stale secondary cloned fragment was offline. A missing row in a stale secondary cloned fragment describes the case when there exists a primary row with a CRID value for which there is no corresponding row in the stale secondary cloned fragment with the same CRID value.

4. Extra

Primary row was deleted while stale secondary cloned fragment was offline. An extra row in a stale secondary cloned fragment describes the case when there exists a row in the stale secondary cloned fragment with a CRID value for which there is no corresponding row in the primary cloned fragment with the same CRID value.

The CRIDs of the stale clone's rows that are not consistent are captured in a temporary file (StaleCloneCRIDs) in an early stage of the refresh technique. That temporary file has a column, Stale_CRID with values that identify records that need to be refreshed, e.g. that are inconsistent, missing, or extra. In one implementation of the temporary file (StaleCloneCRIDs), an additional Batch_ID column can be added and initialized with values that simplify the process of accessing discrete sets of rows within StaleCloneCRIDs in a number of small, incremental batch operations.

Figure 8:
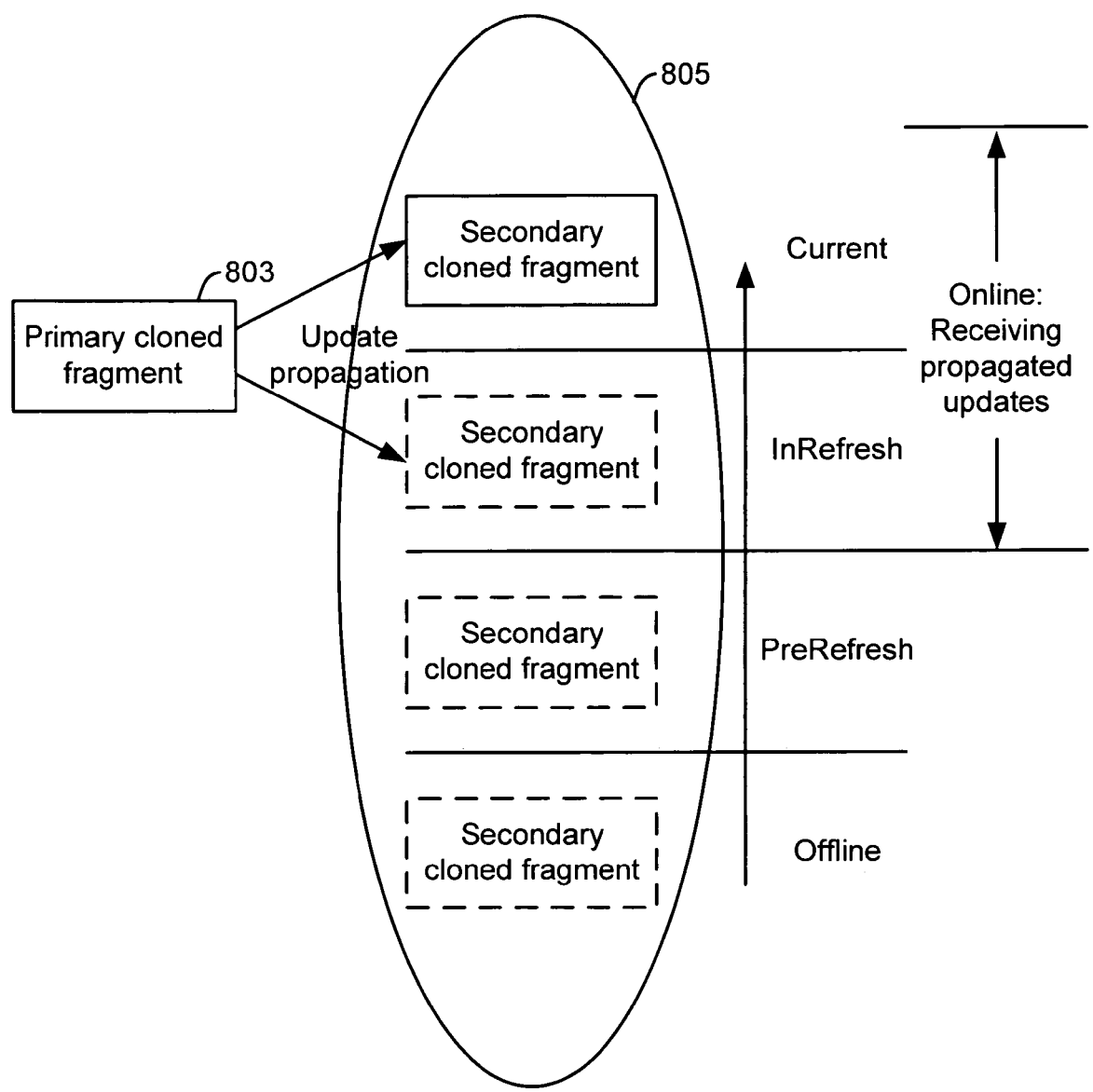
FIG. 8 shows the progression of states when refreshing a stale cloned fragment.

FIG. 8 shows the progression of states when refreshing a stale cloned fragment. As shown in FIG. 8, secondary cloned fragment 805 progresses from an Offline state to a PreRefresh state. While the stale clone is in the PreRefresh state, operations can be applied to the stale clone for purposes of optimizing the performance of the refresh operation. Next, secondary cloned fragment 805 is considered to be online and is placed in the InRefresh state. The stale cloned fragment remains in the InRefresh state while being refreshed. In this state, secondary cloned fragment 805 may be updated by changes propagated from the primary cloned fragment 803.

After the refreshing process has been performed, secondary cloned fragment 805 enters the Current state. Once secondary cloned fragment 805 enters the Current state, it is eligible to become a primary.

Figure 11:
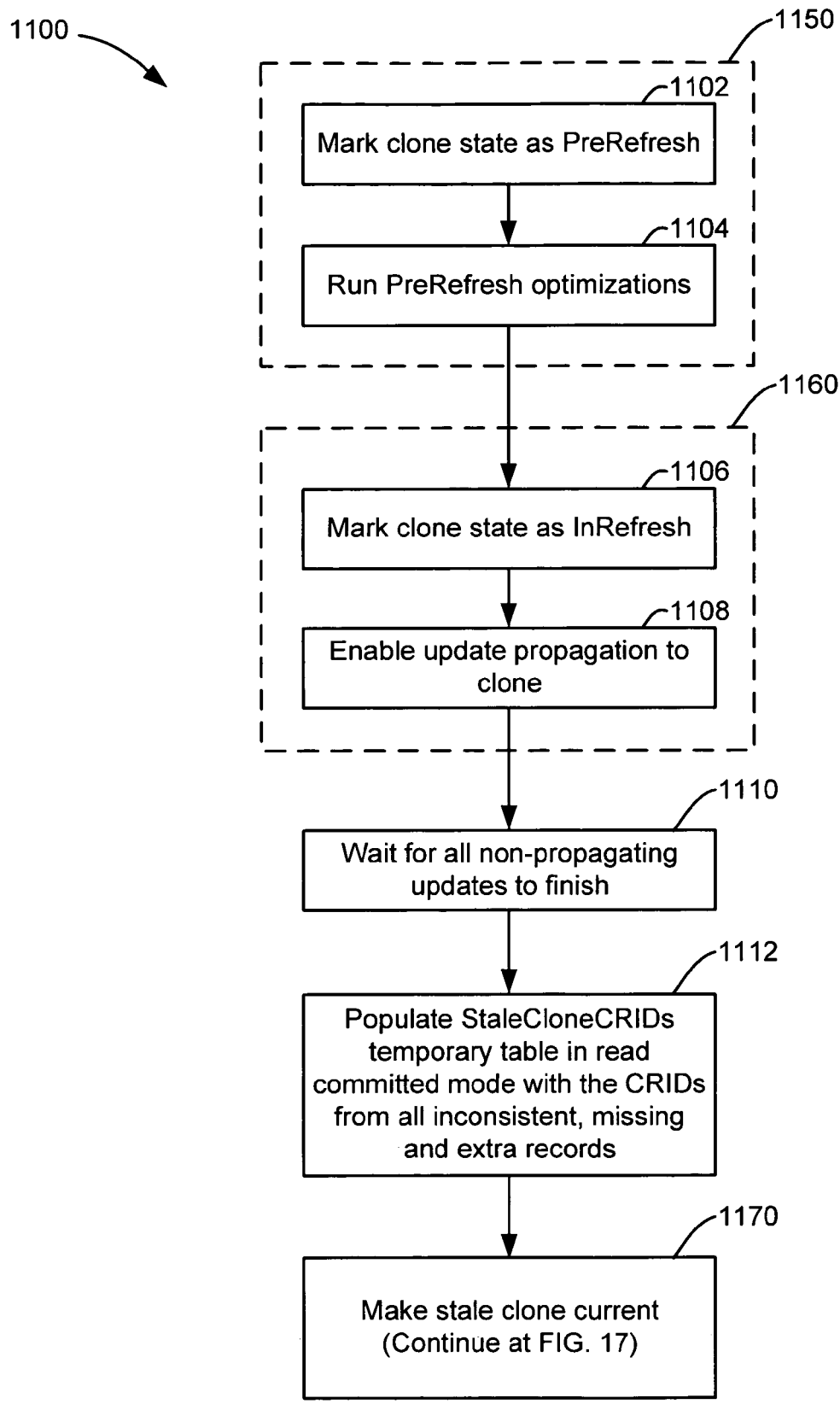
FIG. 11 shows an example refresh process that refreshes a stale cloned fragment of a database object.

FIG. 11 shows an example refresh process 1100 that refreshes a stale cloned fragment of a database object.

0. StaleCloneOnline 1150:
In block 1102, when a stale clone is targeted for Clone Refresh (e.g. when it becomes accessible to the system after being offline), it is placed in a PreRefresh state. Next, in block 1104, pre-pass optimizations can be executed while the cloned fragment is in the PreRefresh state. Such optimizations are designed to optimize the subsequent performance of the remainder of the refresh process 1100.

1. Enable UpdatePropagation 1160:
The stale cloned fragment is marked as being in the InRefresh state at block 1106. Then, at block 1108, propagation of updates are enabled from the primary cloned fragment to the stale cloned fragment. The application of propagated updates to the stale cloned fragment may be selective. For example, the application of propagated updates is performed only on those records that have already been refreshed or that can be determined to require no refresh. That is, propagated updates are applied only to records whose CUID values for a given CRID value match that of the corresponding record in the primary cloned fragment. In another example implementation, if entire row values are propagated by updates, then updates can be propagated and applied to any record of a stale cloned fragment while the cloned fragment is being refreshed.

2. WaitForPropagation 1110:
At the next block 1110, the refresh process 1100 waits until all active DML statements on the primary cloned fragment have started to propagate updates to the stale cloned fragment. (Or an equivalent mechanism is used that ensures all subsequent DML to the primary is consistently propagated to the stale cloned fragment.) Block 1110 can be achieved by waiting for all currently executing DML statements to complete, as any newly activated DML statement is guaranteed to propagate updates to all online cloned fragments, including stale cloned fragments in the InRefresh state.

3. BuildStaleCloneCRIDs 1112:
At block 1112, in ReadCommitted mode, the StaleCloneCRIDs temporary table is created and initialized. StaleCloneCRIDs is guaranteed to cover all non-up-to-date rows (inconsistent, missing and extra rows) in the stale cloned fragment, but due to running in ReadCommitted isolation mode, StaleCloneCRIDs may occasionally include CRIDs rows that are actually consistent. In one implementation of populating the StaleCloneCRIDs temporary table, a SQL outer join operation can be used on the corresponding cloned record identifier (crid) columns of the primary and stale cloned fragments where the corresponding clone update identifier (cuid) column values do not match or are null. The following pseudo-code provides an example of one such outer join. Note that in this example, an additional Batch_Id column is added to the StaleCloneCRIDs table to provide an example basis that could be used for creating refresh batches of a given size.

```
SELECT
    (case when (p.crid is not null ) then p.crid else c.crid end) as crid,
    IDENTITY(int, 1,1) AS Batch_Id
into
    StaleCloneCRIDs
FROM
    (select crid, cuid from primary_fragment_clone) as p
    FULL OUTER JOIN
    (select crid, cuid from stale_fragment_clone) as c
    ON (p.crid = c.crid)
where
    p.cuid < > c.cuid OR
    (p.crid is null) OR
    (c.crid is null)
```

Figure 17:
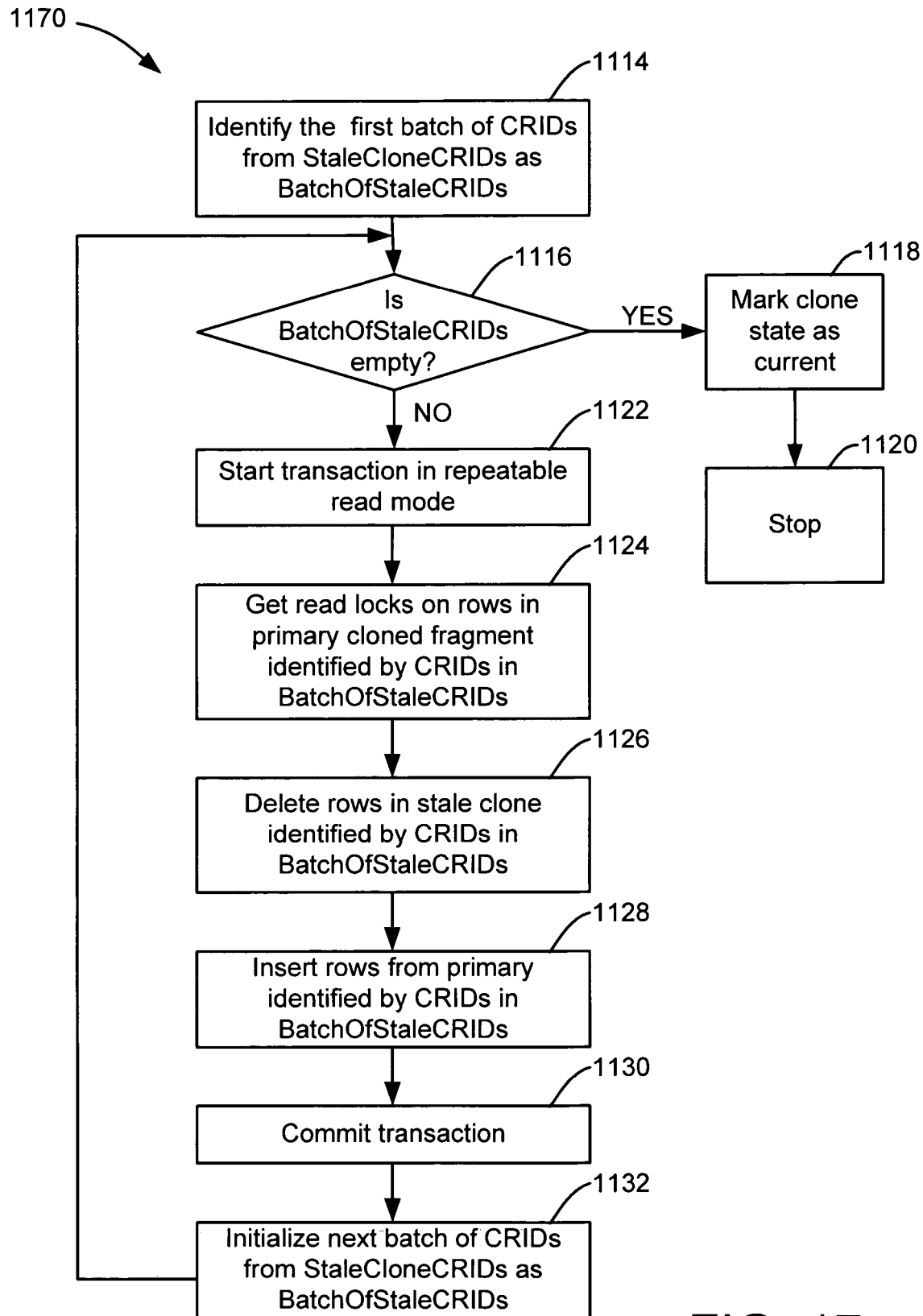
FIG. 17 shows an example process for making a stale clone current as part of the refresh process shown in FIG. 11.

4. MakeCurrent 1170:
FIG. 17 shows an example process 1170 for making a stale clone current. Process 1170 is part of the example refresh process 1100 shown in FIG. 11.

The first small batch (BatchOfStaleCRIDs) of Stale_CRIDs from the StaleCloneCRIDs temporary table is initialized in block 1114. In one example of block 1114, the BatchOfStaleCRIDs are defined to be the CRIDs of rows in the StaleCloneCRIDs temporary table whose Batch_Id column values are between the parameterized values of @start_Id and @end_Id. The initial, actual @start_Id value is set to be that of the smallest Batch_Id column value (e.g. Batch_Id initialized with the seed value of 1 by the IDENTITY function) in the StaleCloneCRIDs temporary table. The initial, actual @end_Id value is then set to the value of the desired BatchSize. The value of BatchSize can be varied to achieve different refresh goals. A smaller value of BatchSize can provide greater concurrency with ongoing user workloads. A larger value for BatchSize may potentially yield better refresh performance. At decision block 1116, a check is made to determine whether the BatchOfStaleCRIDs is empty. If the BatchOfStaleCRIDs is empty, refresh process 1100 proceeds to block 1118 and marks the refreshed cloned fragment as being in the Current state. A secondary cloned fragment in the current state is eligible to become a primary cloned fragment. Then, process 1100 exits at block 1120.

If at decision block 1116, the BatchOfStaleCRIDs is found not to be empty, then:
a. At block 1122, a new transaction is started in Repeated Read mode.
b. At block 1124, read locks are set on rows in the primary cloned fragment identified by BatchOfStaleCRIDs. This step is not functionally required, but is important for purposes of avoiding potential deadlocks with propagated updates.

c. At block 1126, rows are deleted in the stale cloned fragment that are identified by CRIDs in the BatchOfStaleCRIDs. The following pseudo-code describes one example implementation of deleting out-of-date rows from a stale cloned fragment. The actual values of @start_Id and @end_Id are those set earlier in the MakeCurrent process 1170 (at block 1114 or block 1132).

```
delete from stale_fragment_clone
where exists (select * from StaleCloneCRIDs as s
    where stale_fragment_clone.crid = s.crid and
    (s.Batch_Id between @start_Id and @end_Id))
``` d. At block 1128, rows are inserted from the primary clone that are identified by BatchOfStaleCRIDs into the stale cloned fragment. An example pseudo-code description of one example implementation of inserting new rows from the primary fragment into a stale cloned fragment follows. The actual values of @start_Id and @end_Id are those set earlier in the MakeCurrent process 1170 (at block 1114 or block 1132).

```
insert into stale_fragment_clone
select * from primary_fragment_clone as p
where exists
    (select * from StaleCloneCRIDs as s
    where p.crid = s.crid and
    (s.Batch_Id between @start_Id and @end_Id))
``` e. At block 1130, the transaction is committed f. At block 1132, the next batch of CRIDs from the StaleCloneCRIDs temporary table are identified as the next BatchOfStaleCRIDs. The actual values used for the @start_Id and @end_ID are each incremented by the value of the desired BatchSize.

g. The refresh process 1100 then proceeds back to block 1116.

If errors occur during the processing of a BatchOfStaleCRIDs, then the transaction is aborted and the refresh process 1100 exits.

If the refresh process 1100 does not complete successfully, the stale cloned fragment is moved to the PreRefresh state (or to the Offline state if access was completely lost to the stale cloned fragment).

The example cloned fragment refreshing technique makes continuous forward progress, while minimizing conflicts with existing workloads via small, short transactions. The clone refresh technique discussed above can also be applied to cloned index fragments, just as it is applied to cloned data fragments. In one example implementation, stale secondary cloned index fragments can be refreshed from the corresponding primary cloned index fragment.

If all of the cloned data fragments for a base table fragment go offline, then the rows corresponding to that fragment in every index fragment are effectively offline as well. When the base table primary cloned fragment comes back offline, the refresh technique operates on any stale table cloned data fragments as well as on any stale cloned index fragments. At that point, updates operations are propagated to the stale secondary cloned index and data fragments being refreshed. Similarly, if all the cloned fragments for an index fragment go offline, the index access path using that index fragment will be offline. A stale cloned index fragment is restored via clone refresh when it once again becomes accessible. In one example implementation, stale cloned index fragments are refreshed directly using the rows of the base table fragments. However, a stale, secondary cloned index fragment can also be refreshed from the corresponding primary cloned index fragment.

The performance of the database fragment cloning and management mechanism discussed above can be enhanced by the example optimizations discussed below:

a) PreRefresh Step of Clone Refresh

Before running the clone refresh technique, the same refresh technique (described for process 1100 in FIG. 11) can be run, but completely in read committed mode. (For example, when run during a PreRefresh step, block 1122 of process 1100 starts a transaction in Read Committed mode.) In the absence of a lot of parallel updates, this pre-pass will clean up the vast majority of the rows in the cloned fragment, leaving a few inconsistencies, and potentially having introduced a few more. The idea is that after doing the pre-pass, the strict refresh phase (process 1170 in FIG. 17) in repeatable read mode will operate much faster. Fewer rows will be locked (due to fewer batches) for an overall, shorter period of time, thus increasing concurrency in the system.

When a primary cloned fragment has multiple secondary cloned fragments which need refreshing, the refresh passes on all the secondary cloned fragments can be run independently of each other. The degree of parallelism can be controlled based on how quickly the cloned fragments are to be brought back online, traded off against how much of a concurrency hit to impose on the system.

b) Transaction Resilience to Failure of Secondary Cloned Fragment

When a propagated update to a secondary cloned fragment fails for system reasons, the cloned fragment will be marked offline. The effects of ongoing transactions are preserved directly in the rows of the primary cloned fragment. No additional queue of pending work is required for purposes of preserving the effects of prior transactions. For convenience of error handling, the statement whose updates were being propagated can be rolled back. But this is not necessary if the failure of the update propagation to a failed secondary cloned fragment does not have other side effects on the statement's execution. The updates for that statement will have already been applied to and be preserved in the primary cloned fragment.

c) Transaction Resilience to Failure of Primary Cloned Fragment

When a primary cloned fragment fails, a user transaction accessing that cloned fragment need not be aborted if there is an online, consistent secondary cloned fragment that can be designated immediately as a new primary. However, any statement currently accessing the failed primary cloned fragment will be rolled-back.

d) Clone Refresh Resilience

If a clone refresh update to a record in a secondary cloned fragment fails due to system reasons, the clone refresh pass may restart from the beginning, retry the currently active MakeCurrent batch or reiterate the entire MakeCurrent processing of the StaleCloneCRIDs.

Figure 9:
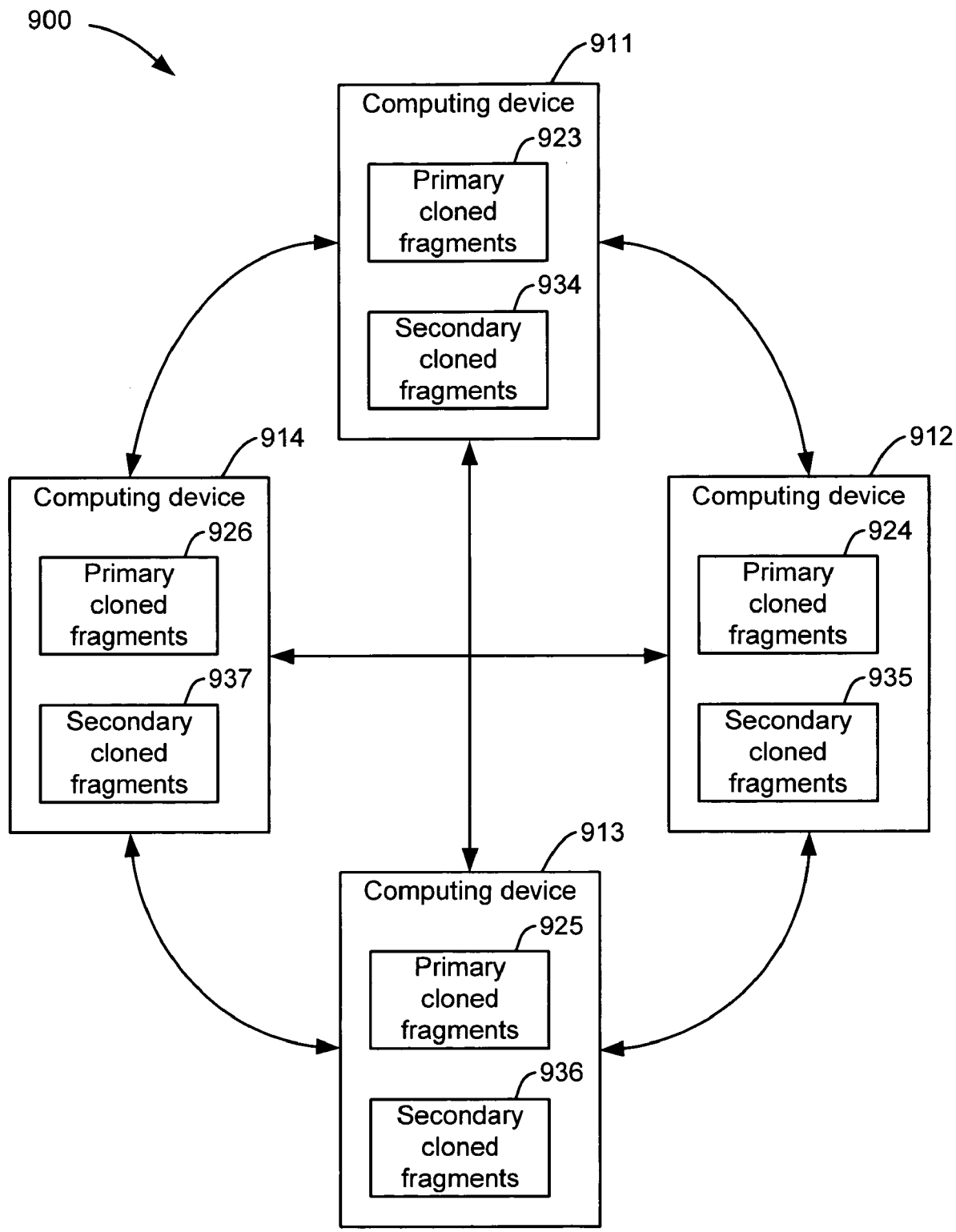
FIG. 9 is an example database system with cloned database fragments.

FIG. 9 is an example database system 900 with cloned database fragments. Database system 900 typically includes multiple computing devices 911-914 for distributing workload and providing reliable availability for accessing a database object as well as load-balancing. An object within the example database is divided into cloned fragments, which are divided among computing devices 911-914. In this manner, computing devices 911-914 can concurrently perform operations on different portions of the object in the example database. Computing devices 911-914 may be configured with any type of database system, such as a SQL server.

As shown in the figure, computing devices 911-914 may include primary cloned fragments 923-926 and secondary cloned fragment 934-937. In one embodiment, primary cloned fragments 923-926 are used by computing devices 911-914 to perform productivity related tasks, such as adding, deleting or modifying the database object, queries, reports, or the like. Secondary cloned fragments 934-937 serve as backup of the primary cloned fragments 923-926.

Typically, the primary cloned fragments in each computing device do not correspond to the secondary cloned fragments in the device. If one of the computing devices 911-914 fails, another computing device can take over the operations using the secondary cloned fragments that correspond to the primary fragments managed by the failed device. In this manner, database system 900 can ensure that a fragment of a database object remains available as long as at least one clone of that fragment remains accessible.

In another embodiment, computing devices 911-914 may include overlapping primary cloned fragments. In this manner, multiple computing devices may perform operations, such as queries, on the same portion of the database object.

Figure 10:
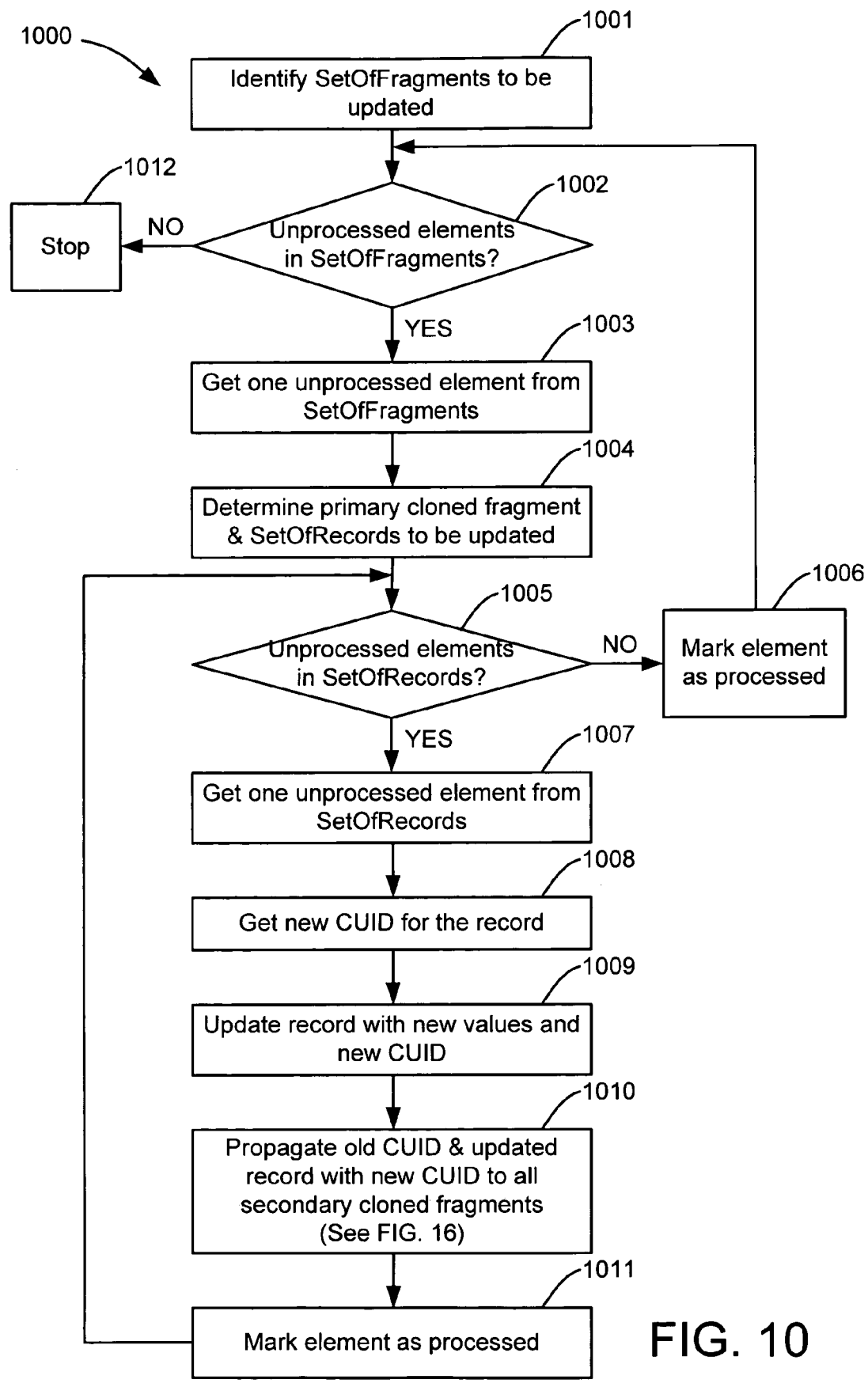
FIG. 10 shows an example process for updating a database object.

FIG. 10 shows an example process 1000 for updating a database object. A database object can include the data of the entire database or a portion of the database, such as a table, an index or the like. An update may involve the modification of one or more of the fragments. At block 1001, fragments of the database object that are affected by the update are identified, and these form a set named SetOfFragments, that is a local data structure for the process 1000. Each element in this set is initially marked as unprocessed (this does not change the actual fragment, just the element in the local data structure). Process 1000 continues to decision block 1002, where a determination is made whether there still remain any unprocessed elements in the set SetOfFragments. If not, process 1000 continues to termination block 1012 where the process terminates.

Returning to decision block 1002, if there still remain unprocessed elements in the set SetOfFragments, process 1000 continues to block 1003, where the unprocessed element is obtained from the set SetOfFragments, and this represents the fragment that should be updated next. At block 1004, the corresponding primary cloned fragment is determined, and the set of records within the primary cloned fragment that need to be updated, are identified, forming a set named SetOfRecords, that is a local data structure for the process 1000. Each element in this set is initially marked as unprocessed (this does not change the actual record, just the element in the local data structure). At decision block 1005, a determination is made whether there still remain any unprocessed elements in the set SetOfRecords. If not, process 1000 continues to block 1006, where the current element in the set SetOfFragments is marked as processed (this does not change the actual fragment, just the element in the local data structure). Process 1000 then goes back to decision block 1002.

Returning to decision block 1005, if there still remain unprocessed elements in the set SetOfRecords, process 1000 continues to block 1007, where an unprocessed element is obtained from the set SetOfRecords. That element represents the record that should be updated next. In block 1008, a CUID is obtained for the record. (CUID value maintenance and assignment is further described elsewhere in this document in the context of FIGS. 12 and 13.)

Figure 16:
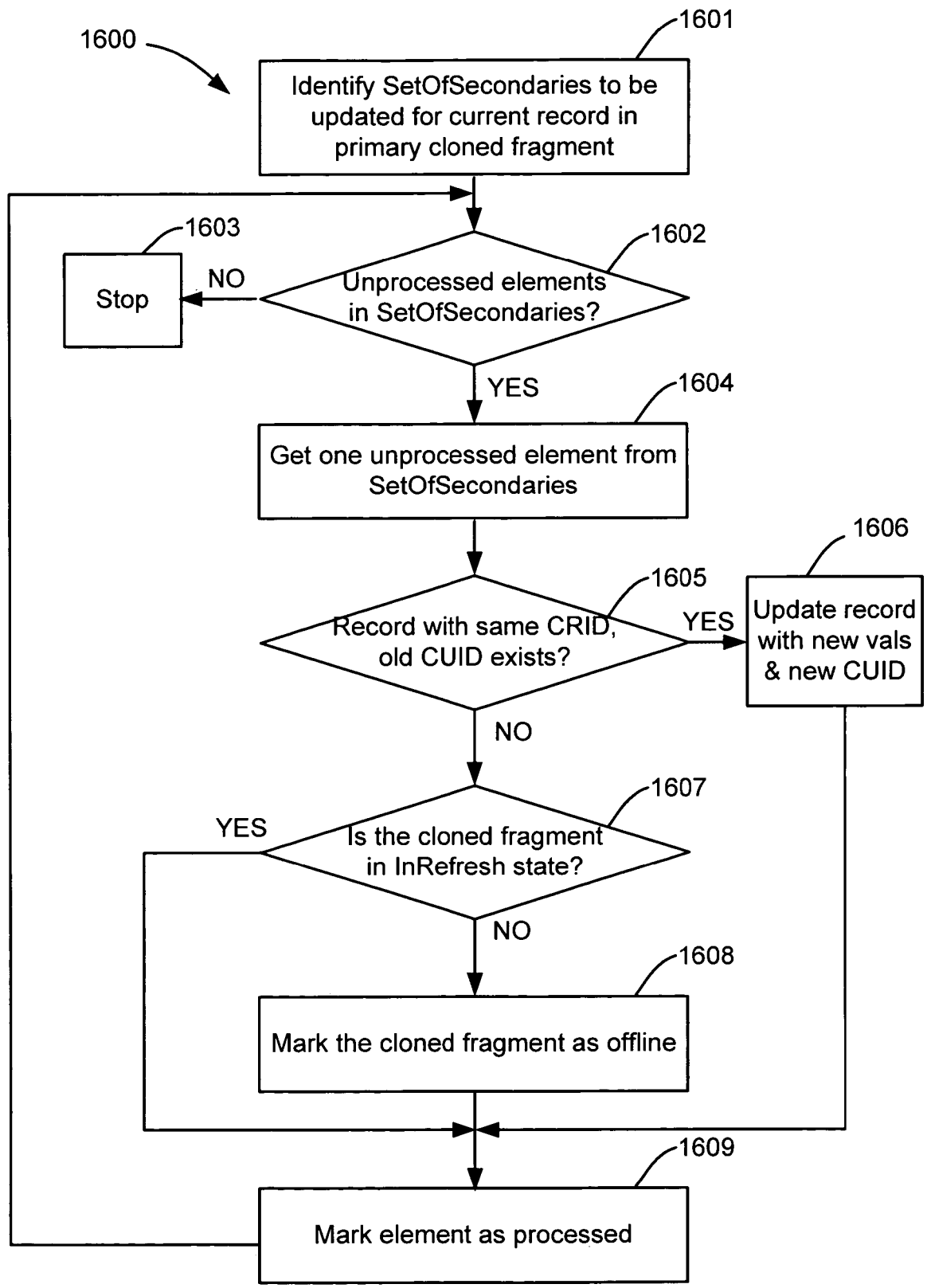
FIG. 16 shows an example process for propagating and applying updates to a record and propagating an old CUID value from a primary cloned fragment to all secondary cloned data fragments, as well as to all cloned index fragments that contain a copy of the record.

Process 1000 continues to block 1009, where the record is updated with the new values as well as the new CUID. At block 1010, the old CUID, as well as the updated record (containing the new CUID) is propagated to all secondary cloned data fragments, as well as to all cloned index fragments that contain a copy of this record, both primary and secondary. FIG. 16 describes this block in more detail.

After the update has been propagated and applied, process 1000 continues to block 1011, where the current element in the set SetOfRecords is marked as processed (this does not change the actual record, just the element in the local data structure). Process 1000 then goes back to decision block 1005.

Figure 12:
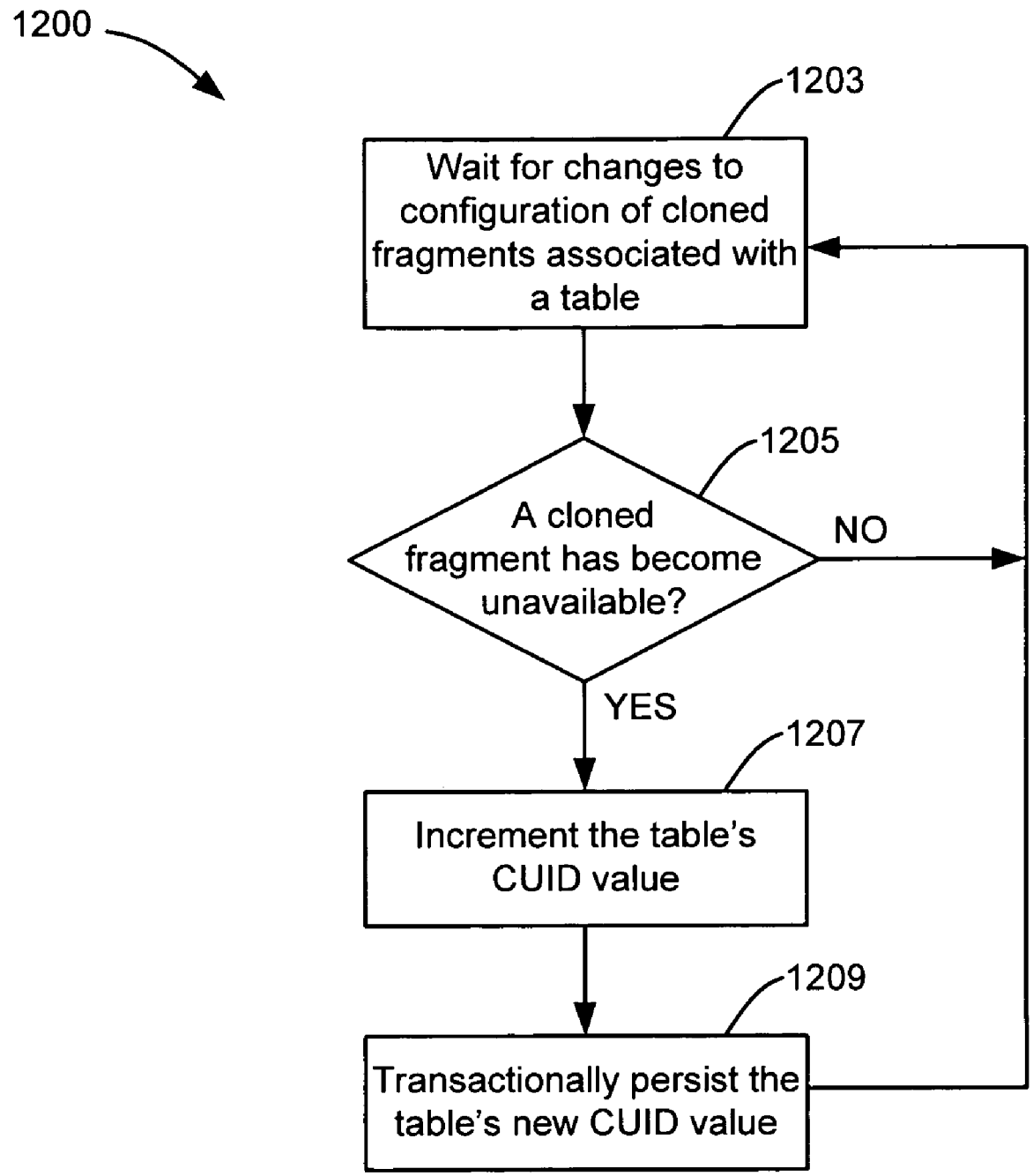
FIG. 12 shows an example process for modifying clone update identifiers (CUIDs).

FIG. 12 shows an example process 1200 for modifying clone update identifiers (CUIDs). Process 1200 may be implemented for each database object, such as a table of a database. At block 1203, process 1200 waits for changes to the configuration of cloned fragments associated with a table. At decision block 1205, a determination is made whether a cloned fragment has become unavailable. If the cloned fragments are all available, process 1200 returns to the wait state at block 1203.

Returning to decision block 1205, if a cloned fragment has become unavailable, process 1200 moves to block 1207 where the table's CUID value is incremented. At block 1209, the table's new CUID value is transactionally persisted.

Figure 13:
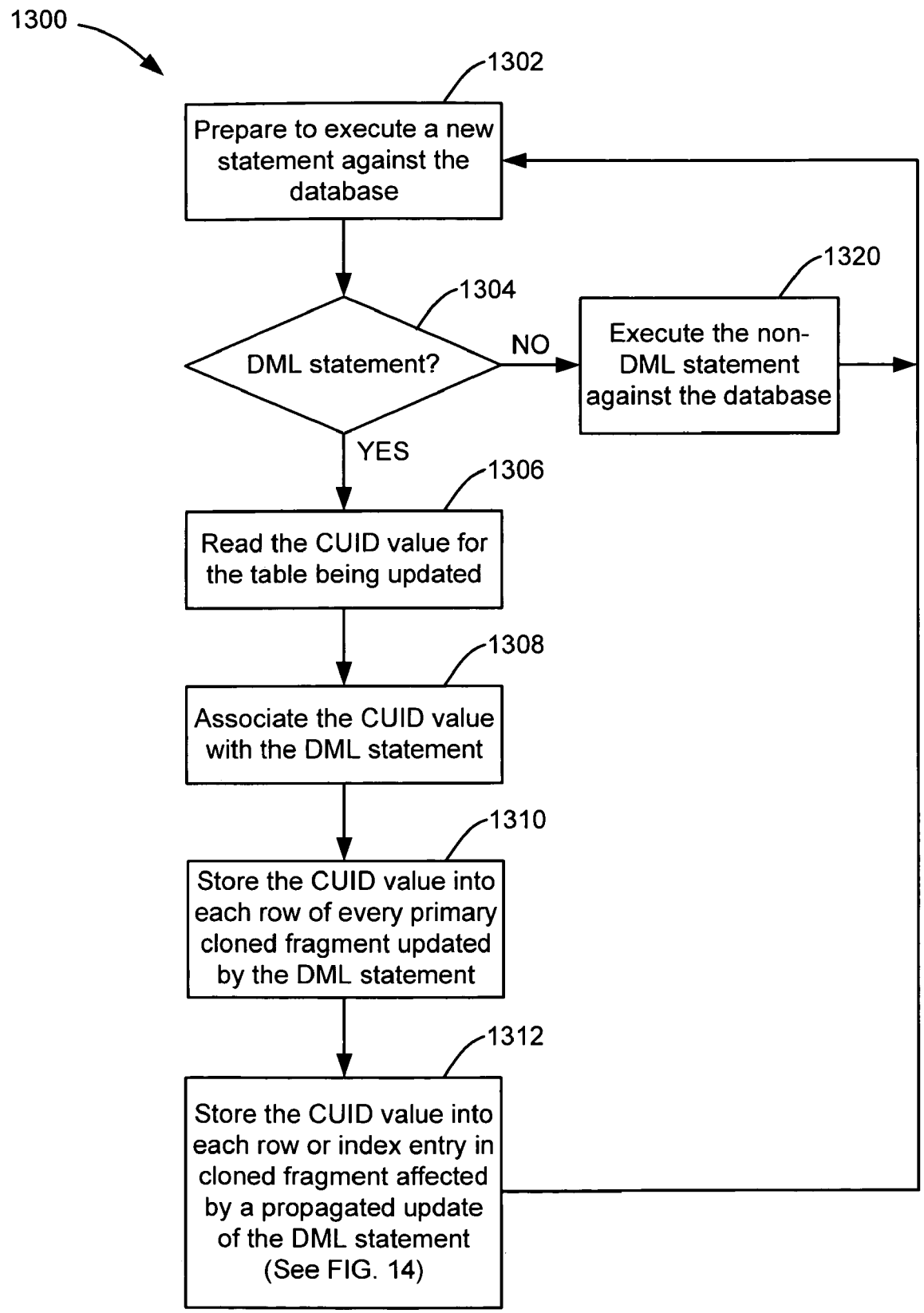
FIG. 13 shows an example process for assigning a CUID value allocated in accordance with the process shown in FIG. 12.

FIG. 13 shows an example process 1300 for assigning a CUID value allocated in accordance with process 1200 shown in FIG. 12. A database system may be configured to execute process 1300 for statements that operate on a database. At block 1302, the process prepares to execute a new statement against the database. At decision block 1304, a determination is made whether the new statement is a DML statement, which typically includes operations such as insert, delete and modify items in a database. If the statement is not a DML statement, process 1300 goes to block 1320 where the non-DML statement is executed against the database. Then, the process returns to block 1302.

Returning to decision block 1304, if the statement is a DML statement, process 1300 continues at block 1306 where the CUID value for a table of a database being updated is read. At block 1308, the CUID value is associated with the DML statement. At block 1310, the CUID value is stored into each row of every primary cloned fragment updated by the DML statement. At block 1312, the CUID value is stored into each row or index entry in cloned fragment affected by a propagated update of the DML statement. The CUID value may be propagated with the update to both cloned data and index fragments. Example propagation paths for CUID values will be discussed in conjunction with FIG. 14. When the CUID value has been propagated, process 1300 returns to block 1302.

Figure 14:
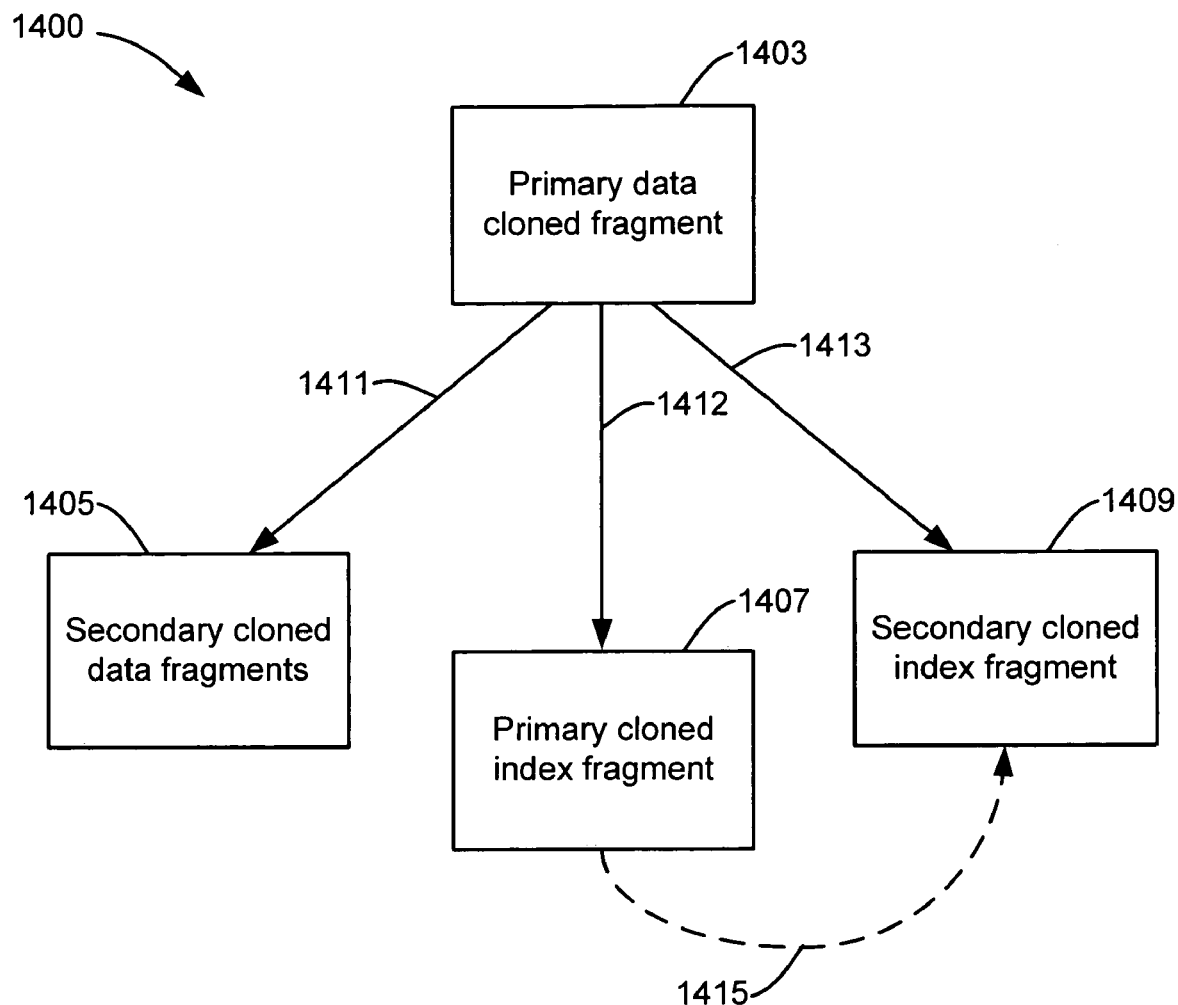
FIG. 14 shows example propagation paths for CUID values.

FIG. 14 shows example propagation paths for CUID values. In FIG. 14, primary cloned data fragment 1403 has implemented an update included in a DML statement. As discussed above, a CUID value associated with the DML statement is stored in each row updated by the DML statement in the primary cloned data fragment 1403. Primary cloned data fragment 1403 may propagate the CUID value along with the update to secondary cloned data fragments 1405 through path 1411. Particularly, the CUID value associated with the DML statement is assigned to each row affected by the update propagation. In one implementation, the CUID value is propagated to the primary cloned index fragment 1407 and secondary cloned index fragment 1409 from primary cloned data fragment through paths 1412 and 1413, respectively. In another implementation, instead of propagating the CUID value with path 1413, the CUID value is propagated from the primary cloned index fragment 1407 to secondary cloned index fragment 1409 through path 1415.

FIG. 16 shows an example process 1600 for propagating and applying an updated record and old CUID value from a primary cloned fragment to all secondary cloned data fragments, as well as to all cloned index fragments that contain a copy of this record. Those cloned fragments receiving propagated updates could be in the Current state, or they could be in the InRefresh state. Process 1600 typically forms one step in a larger update process, described in another part of this document. At block 1601, all secondary cloned data fragments, as well as all cloned index fragments (both primary and secondary) that contain a copy of this record are identified. Those cloned fragments form a set named SetOfSecondaries, that is a local data structure for the process 1600. Each element in this set is initially marked as unprocessed (this does not change the actual cloned fragment, just the element in the local data structure). Process 1600 continues to decision block 1602, where a determination is made whether there still remain any unprocessed elements in the set SetOfSecondaries. If not, process 1600 continues to termination block 1603 where the process terminates, and any larger process that comprises process 1600 as a step, then continues on to the next step in that larger process.

Returning to decision block 1602, if there still remain unprocessed elements in the set SetOfSecondaries, process 1600 continues to block 1604, where an unprocessed element is obtained from the set SetOfSecondaries. That element represents the secondary cloned fragment that should be updated next. That secondary cloned fragment could be a secondary cloned data fragment, a primary cloned index fragment, or a secondary cloned index fragment. At decision block 1605, a determination is made whether a record exists in the secondary cloned fragment with the same CRID as the record from primary cloned fragment, and whose CUID matches the old CUID value of the record from primary cloned fragment. If yes, then process 1600 continues to block 1606, where the record is updated with new values and the new CUID. Process 1600 then continues to block 1609.

Returning to decision block 1605, if a matching record is not found, then process 1600 continues to decision block 1607, where a determination is made whether the secondary cloned fragment is in the InRefresh state. If not, then at block 1608, the secondary cloned fragment is marked offline, since it is no longer consistent with the primary cloned fragment. Process 1600 then continues to block 1609.

Returning to decision block 1607, if the secondary cloned fragment is in the InRefresh state, then process 1600 continues to block 1609, where the current element in the set SetOfSecondaries is marked as processed (this does not change the actual cloned fragment, just the element in the local data structure). Process 1600 then goes back to decision block 1602.

Figure 15:
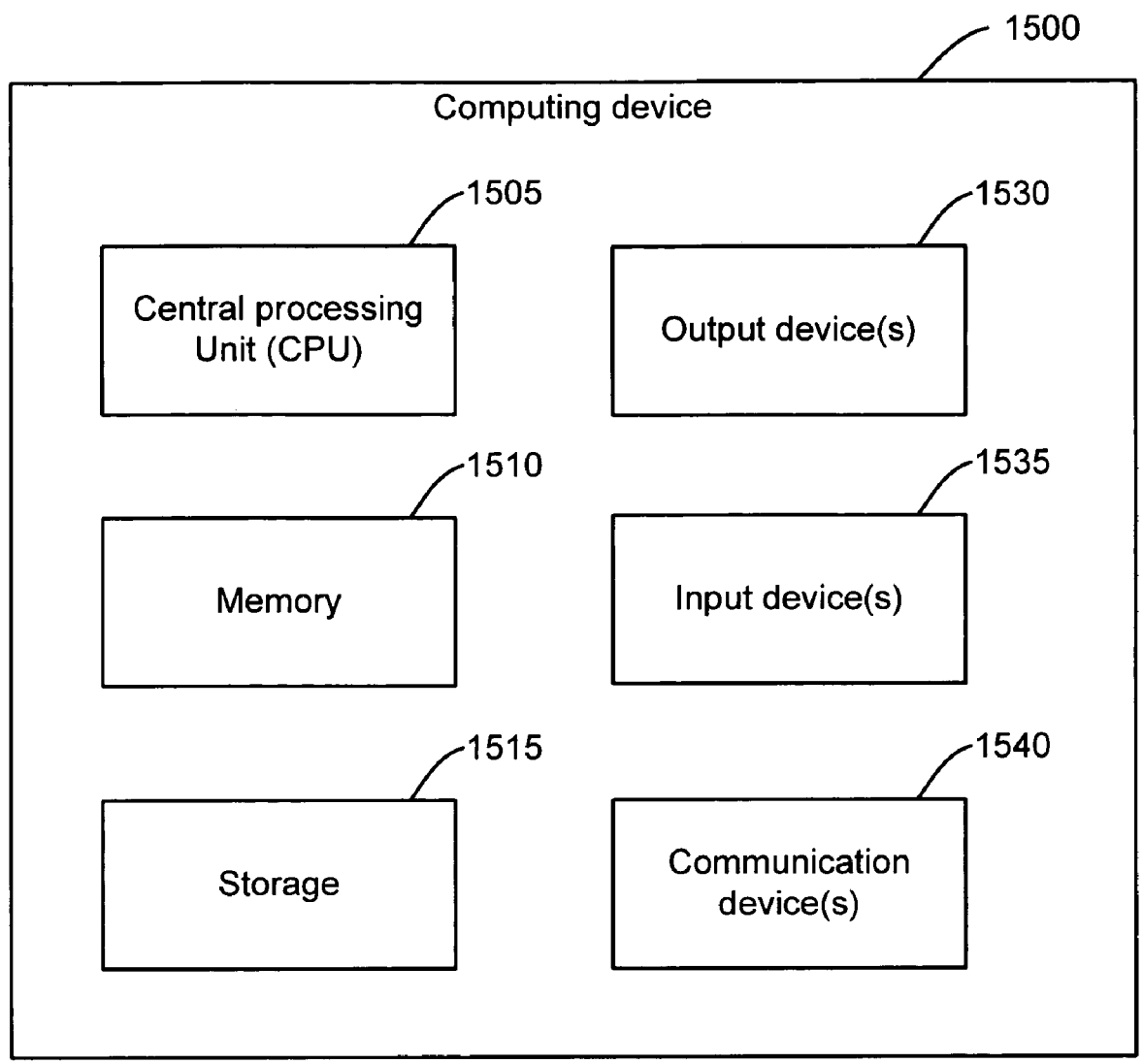
FIG. 15 shows an example computer device for implementing the described systems and methods.

FIG. 15 shows an example computer device 1500 for implementing the described systems and methods. In its most basic configuration, computing device 1500 typically includes at least one central processing unit (CPU) 1505 and memory 1510.

Depending on the exact configuration and type of computing device, memory 1510 may be volatile (such as RAM), non-volatile (such as ROM, flash memory, etc.) or some combination of the two. Additionally, computing device 1500 may also have additional features/functionality. For example, computing device 1500 may include multiple CPU's. The described methods may be executed in any manner by any processing unit in computing device 1500. For example, the described process may be executed by multiple CPU's in parallel.

Computing device 1500 may also include additional storage (removable and/or non-removable) including, but not limited to, magnetic or optical disks or tape. Such additional storage is illustrated in FIG. 15 by storage 1515. Computer storage media includes volatile and nonvolatile, removable and non-removable media implemented in any method or technology for storage of information such as computer readable instructions, data structures, program modules or other data. Memory 1510 and storage 1515 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1500. Any such computer storage media may be part of computing device 1500.

Computing device 1500 may also contain communications device(s) 1540 that allow the device to communicate with other devices. Communications device(s) 1540 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media or device-readable media as used herein includes both computer storage media and communication media. The described methods may be encoded in any computer-readable media in any form, such as data, computer-executable instructions, and the like.

Computing device 1500 may also have input device(s) 1535 such as keyboard, mouse, pen, voice input device, touch input device, etc. Output device(s) 1530 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more device-readable storage media with device-executable instructions for performing steps comprising:
creating a primary cloned fragment associated with a subset of records in a database table, the primary cloned fragment having a first plurality of records; adding a first plurality of update identifiers to the primary cloned fragment, wherein each of the first plurality of update identifiers is a member of one of the first plurality of records; in response to a secondary cloned fragment being offline during an update, preserving an update in the primary cloned fragment; identifying the secondary cloned fragment corresponding to the primary cloned fragment, the secondary cloned fragment being stale relative to the primary cloned fragment and the secondary cloned fragment having a second plurality of records and a second plurality of update identifiers, wherein each of the second plurality of update identifiers is a member of one of the second plurality of records; refreshing the stale secondary cloned fragment with the preserved update when the stale secondary cloned fragment returns online by performing a database operation, wherein the refreshing step further comprises: identifying a first update identifier of a first record in the first plurality of records included in the primary cloned fragment; identifying a second update identifier of a second record in the second plurality of records in the stale secondary cloned fragment, the second record corresponding to the first record; and determining whether the first record and second record with identical cloned record identifiers are consistent based, at least in part, on whether the first update identifier and the second update identifier are equal and while refreshing the stale secondary cloned fragment: performing an update to the primary cloned fragment; and updating the stale secondary cloned fragment in response to the performing the update on the primary cloned fragment.

2. The one or more device-readable storage media as recited in claim 1, wherein the updating step further comprises updating up-to-date rows of the stale secondary cloned fragment, but not updating any non-up-to-date rows of the stale secondary cloned fragment.

3. The one or more device-readable storage media as recited in claim 1, wherein the refreshing step further comprises, when the first and second records are determined to be inconsistent,
   refreshing the second record with data in the first record; and
   assigning a value of the first update identifier to the second update identifier.

4. The one or more device-readable storage media as recited in claim 3, further comprising performing the determining, refreshing and assigning steps for each record of the second plurality of records included in the secondary cloned fragment.

5. The one or more device-readable storage media as recited in claim 1, wherein the refreshing step further comprises running a pre-refreshing operation on the secondary cloned fragment in a read committed mode.

6. The one or more device-readable storage media as recited in claim 5, wherein the pre-refreshing operation is run in parallel on other secondary cloned fragments corresponding to the primary cloned fragment.

7. The one or more device-readable storage media as recited in claim 1, wherein the database operation for refreshing the secondary cloned fragment includes Data Manipulator Language (DML) operations of inserting, deleting and updating records in the secondary clone.

* * * * *

UNITED STATES PATENT AND TRADEMARK OFFICE
CERTIFICATE OF CORRECTION

| | | |
|---|---|---|
| PATENT NO. | : 7,890,508 B2 | Page 1 of 1 |
| APPLICATION NO. | : 11/207482 | |
| DATED | : February 15, 2011 | |
| INVENTOR(S) | : Robert H. Gerber et al. | |

It is certified that error appears in the above-identified patent and that said Letters Patent is hereby corrected as shown below:

In column 19, line 25, in Claim 1, delete "equal" and insert -- equal; --, therefor.

Signed and Sealed this
Twenty-sixth Day of July, 2011

David J. Kappos
*Director of the United States Patent and Trademark Office*